(12) United States Patent
Wiersema et al.

(10) Patent No.: US 12,260,880 B2
(45) Date of Patent: Mar. 25, 2025

(54) MEDIA EDITING USING STORYBOARD TEMPLATES

(71) Applicant: Apple Inc., Cupertino, CA (US)

(72) Inventors: Daniel J. Wiersema, San Jose, CA (US); Teresa F. Perera, Fairfield, CT (US); Jennifer L. Nassef Anderson, Sierra Madre, CA (US); David R. Black, San Jose, CA (US); Ivan Pinzon, Cupertino, CA (US); Nathalie Castel, Sunnyvale, CA (US); Andrea L. Angquist, Los Altos Hills, CA (US); Kain Osterholt, San Jose, CA (US); Peter A. Steinauer, San Francisco, CA (US); Shawn M. Spencer, Sunnyvale, CA (US); Hans H. Kim, Santa Monica, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/958,129

(22) Filed: Sep. 30, 2022

(65) Prior Publication Data
US 2023/0282240 A1 Sep. 7, 2023

Related U.S. Application Data

(60) Provisional application No. 63/317,434, filed on Mar. 7, 2022.

(51) Int. Cl.
G11B 27/031 (2006.01)
G11B 27/34 (2006.01)

(52) U.S. Cl.
CPC ............ *G11B 27/031* (2013.01); *G11B 27/34* (2013.01)

(58) Field of Classification Search
None
See application file for complete search history.

(56) References Cited

U.S. PATENT DOCUMENTS

| | | | | |
|---|---|---|---|---|
| 9,998,722 | B2* | 6/2018 | Swearingen | G11B 27/34 |
| 2013/0272673 | A1* | 10/2013 | Swearingen | G11B 27/34 386/281 |
| 2017/0092331 | A1* | 3/2017 | Eppolito | H04N 21/47205 |
| 2017/0109585 | A1* | 4/2017 | Matias | H04N 21/44204 |
| 2018/0024705 | A1* | 1/2018 | Silano | G06F 3/0482 715/720 |

(Continued)

*Primary Examiner* — Gelek W Topgyal
(74) *Attorney, Agent, or Firm* — Invoke

(57) ABSTRACT

In some implementations, a computing device can guide a user of the computing device through creation of media content using storyboard templates. For example, the user may invoke a media editing application on the computing device. The media editing application can be configured with a plurality of different storyboard templates to be used for the creation of different types or categories of content. A storyboard template corresponding to a particular type of content can include suggested media segments and suggested media clips for the particular type, or topic, of content. Thus, a particular storyboard template can include suggested media segments and suggested media clips that are different from other storyboard templates. The media editing application can include features that allow the user to edit the storyboard template and/or the media content corresponding to a storyboard project created by the user.

17 Claims, 27 Drawing Sheets

(56) References Cited

U.S. PATENT DOCUMENTS

2018/0068019 A1* 3/2018 Novikoff ............. G06F 16/7867
2019/0130192 A1* 5/2019 Kauffmann .......... G11B 27/031
2020/0382723 A1* 12/2020 Pena .................... G11B 27/005
2024/0205516 A1* 6/2024 Ehrhard ............... H04N 21/274

* cited by examiner

Style Template 202
- Banner Type 204
- Video Treatments 206
- Transitions 208
- Background Music 210
- Font 212
- Image Filter 214
- Color 216
- Style ID 218

FIG. 2 ized scope in the parent application(s) or the prosecution history thereof and advise the USPTO that the claims in the application may be broader that any claim in the parent.

MEDIA EDITING USING STORYBOARD TEMPLATES

INCORPORATION BY REFERENCE; DISCLAIMER

The following application is hereby incorporated by reference: application No. 63/317,434 filed on Mar. 7, 2022. The applicant hereby rescinds any disclaimer of claims scope in the parent application(s) or the prosecution history thereof and advise the USPTO that the claims in the application may be broader that any claim in the parent.

TECHNICAL FIELD

The disclosure generally relates to media editing systems.

BACKGROUND

Media content creation has become popular among a wide variety of people for a variety of different reasons. People enjoy creating media content for sharing through social media with their friends. People create media content to share ideas, teach and inform the public, and/or to make money from the created content. The popularity of content creation among the general public has led to many novice content creators attempting to create video and/or audio content without the benefit of training, education or experience with respect to how to structure and create high quality content. Often novice content creators will put together video clips, audio clips, still images to create a movie or video but then, after reviewing the final media product, are left wondering why the quality of their final media product is not as polished as more experienced or professional media content creators.

SUMMARY

In some implementations, a computing device can guide a user of the computing device through creation of media content using storyboard templates. For example, the user may invoke a media editing application on the computing device. The media editing application can be configured with a plurality of different storyboard templates to be used for the creation of different types or categories of content. A storyboard template corresponding to a particular type of content can include suggested media segments and suggested media clips for the particular type, or topic, of content. Thus, a particular storyboard template can include suggested media segments and suggested media clips that are different from other storyboard templates. The media editing application can include features that allow the user to edit the storyboard template and/or the media content corresponding to a storyboard project created by the user.

Particular implementations provide at least the following advantages. By providing preconfigured, curated storyboard templates for a variety of content topics that guide the user through the creation of a media project, the user can more efficiently create high quality digital media products and avoid the frustration of wasting time creating a low-quality digital media product. Additionally, storyboard templates can be used as a teaching tool that guides the user through the steps necessary to create a high-quality digital media product while reducing the amount of time it takes a novice user to learn how to create high quality digital media products. By presenting a graphical user interface that integrates the structural elements of a curated storyboard template with the media editing tools of the media editing application, the user can intuitively and efficiently interact with the media editing application to create and/or edit a digital media project.

Details of one or more implementations are set forth in the accompanying drawings and the description below. Other features, aspects, and potential advantages will be apparent from the description and drawings, and from the claims.

DESCRIPTION OF DRAWINGS

FIG. 2 is a block diagram of an example style template data structure.

Like reference symbols in the various drawings indicate like elements.

DETAILED DESCRIPTION

Figure 1:
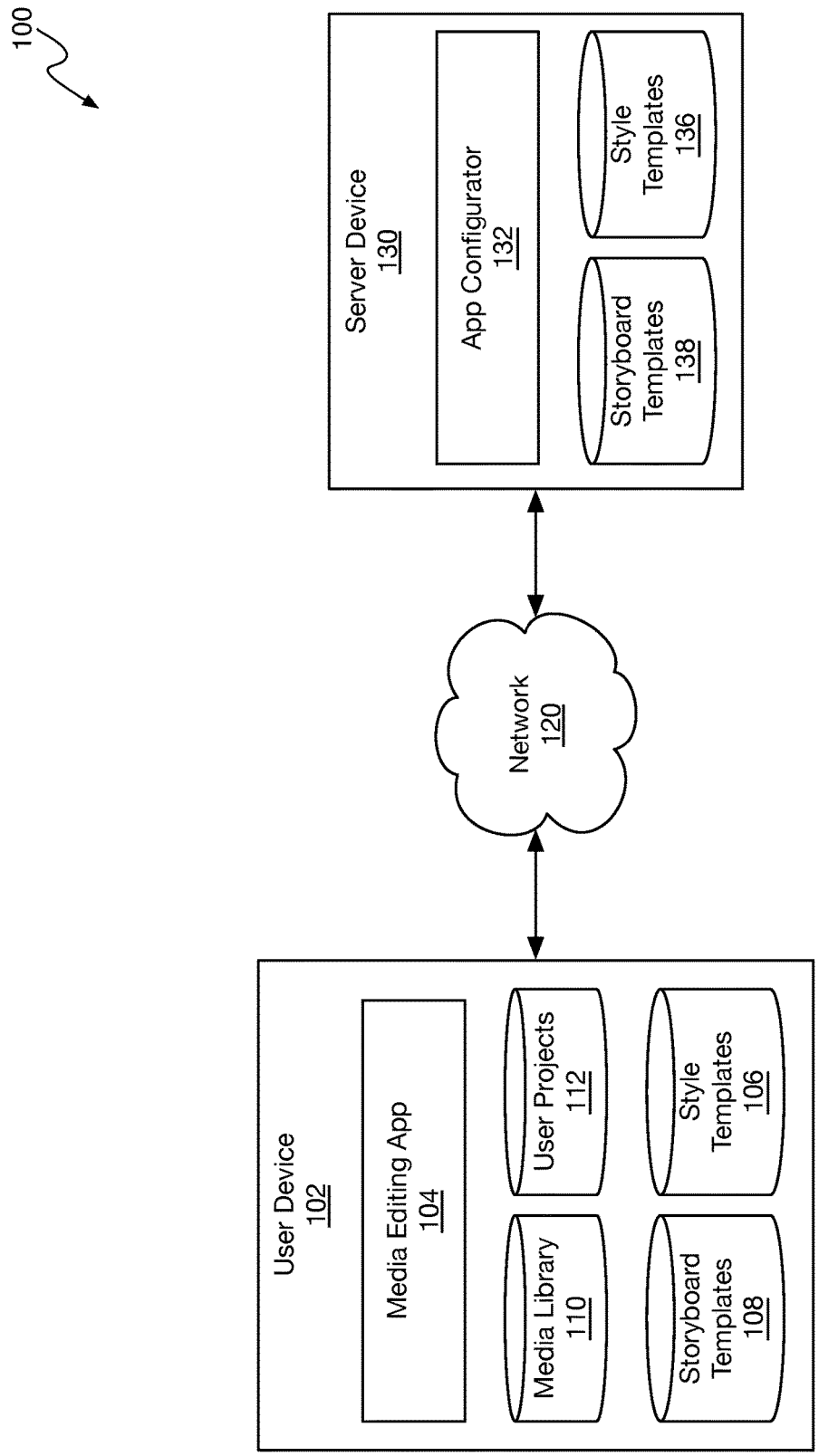
FIG. 1 is a block diagram of an example system for media editing using storyboard templates.

FIG. 1 is a block diagram of an example system 100 for media editing using storyboard templates. For example, system 100 can be a computing system configured with a media editing application that can provide pre-configured storyboard templates that guide a user through the process of creating and/or editing digital media content.

In some implementations, system 100 can include user device 102. For example, user device 102 can be a computing device, such as a desktop computer, laptop computer, smartphone, tablet computer, or any other type of computing device. User device 102 can have an integral display. For example, an integral display can be built into user device 102, like a laptop computer, smartphone, tablet computer, etc.). User device 102 can have an external display. For example, the external display can be connected to user device 102 through a wire or cable, like a desktop computer with an external monitor. The external display can be connected to user device 102 wirelessly, like a smartphone mirroring its display to an external monitor through a wireless (e.g., Wi-Fi, Bluetooth, etc.) connection.

In some implementations, user device 102 can include media editing application 104. For example, media editing application 104 can be a software application installed and/or running on user device 102. Media editing application 104 can be configured with various user interfaces (e.g., described below) that guide a user through selection, creation, and/or editing of media clips (e.g., video clips, audio clips, digital media content, etc.) for a digital media project. Media editing application 104 can guide the user through the creation of the media project by presenting preconfigured storyboard templates that the user can follow and/or modify when creating a media project, as described further below.

In some implementations, user device 102 can include style templates database 106. For example, style templates database 106 can include a various, different style templates that define the look and feel of a media project. When creating and/or editing a media project (e.g., a video, movie, etc.), the user can select a style template that has predefined (e.g., default) values that will define the look and feel of the media project. The user can modify or edit various attributes of a selected style template to customize a predefined style to the user's liking. An example style template data structure is illustrated in FIG. 2.

FIG. 2 is a block diagram of an example style template data structure 200. For example, style template data structure 300 can be used to define a variety of different style templates, including style template 202.

In some implementations, style template 202 can include a banner type attribute 204. For example, the banner type attribute 204 can define or specify a type of informational banner that may be presented by as an overlay on top of a video, video clip, or video shot during playback of the video. The banner type attribute can have a corresponding value that identifies one or more of a plurality of different banner types that can be presented when playing back a media project associated with style template 202. Different banner types may have different appearances (e.g., thick, thin, angled, horizontal, vertical, etc.) and/or different presentation locations (e.g., left side, right side, middle, bottom, top, etc.) with respect to the video over which the banner is presented.

In some implementations, style template 202 can include a video treatments attribute 206. For example, the video treatments attribute 206 can define or specify a type of treatment (e.g., video surround, video framing, etc.) that may be presented during playback of the video. For example, a video treatment may present a less than full screen video near the middle of the display and framed by a colorful background image. Another video treatment may present a less than full screen video at an angle (e.g., the video presentation area by be tilted) near the right-hand side of the display and framed by an industrial background image. The video treatments attribute 206 can have a corresponding value that identifies one or more of a plurality of different video treatment types that can be presented when playing back a media project associated with style template 202. Different video treatment types may have different appearances (e.g., striped colors, flowers, industrial, beach, vacation themed, etc.) and/or have different video presentation locations (e.g., left side, right side, middle, bottom, top, etc.) and/or video presentation orientations (e.g., horizontal, angled, wide screen, narrow, etc.).

In some implementations, style template 202 can include a transitions attribute 208. For example, transitions attribute 208 can define or specify a type of transition that may be presented during playback of the video when transitioning from one video clip, or shot, to the next video clip. Transitions attribute 208 can define or specify a type of transition that may be presented during playback of the video when transitioning from one media project segment to another media project segment (segments are described in further detail below). For example, the video transitions specified by transition attribute 208 can include a fade in, a fade out, a wash out, a cross dissolve, a ripple dissolve, a jump cut, a cutaway, an iris in, an iris out, a wipe transition, and/or any other well-known transition type. Transitions attribute 208 can have a corresponding value that identifies one or more of a plurality of different video transition types that can be presented when playing back a media project associated with style template 202. Different style templates may be preconfigured with different video transitions. However, a user may edit or modify a selected style template (e.g., style template 202) to select different transition types.

In some implementations, style template 202 can include background music attribute 210. For example, background music attribute 210 can define or specify background music (e.g., a music track, collection of music tracks, etc.) that may be presented during playback of a media project. Background music attribute 210 can have a corresponding value that identifies one or more music tracks that can be presented when playing back a media project associated with style template 202. Different style templates may be preconfigured with different background music. However, a user may edit or modify a selected style template (e.g., style template 202) to select different background music (e.g., from the user's personal music library, from a network source, etc.).

In some implementations, style template 202 can include font attribute 212. For example, font attribute 212 can define or specify font types (e.g., sizes, styles, etc.) that may be used when presenting text (e.g., on a banner, treatment, title, etc.) during playback of a media project. Font attribute 212 can have a corresponding value that identifies one or more font types that can be presented when playing back a media project associated with style template 202. Different style templates may be preconfigured with different font types.

However, a user may edit or modify a selected style template (e.g., style template 202) to select different font types according to the user's preference.

In some implementations, style template 202 can include image filter attribute 214. For example, image filter attribute 214 can define or specify image filters, or effects, (e.g., vintage, monochromatic, vivid, dramatic, etc.) that may be applied to video images or frames when presenting video (e.g., video, still images, movies, etc.). Image filter attribute 214 can have a corresponding value that identifies one or more filter types, or effects, that can be applied to video images when playing back a media project associated with style template 202. Different style templates may be preconfigured with different filter types. However, a user may edit or modify a selected style template (e.g., style template 202) to select different filter types, or effects, according to the user's preference.

In some implementations, style template 202 can include color attribute 216. For example, color attribute 216 can define or specify a color, or color palette, that may be used on banners, treatments, and/or other graphical objects when presenting a media project. Color attribute 216 can have a corresponding value that identifies a color, or color palette. Different style templates may be preconfigured with different colors or color palettes. However, a user may edit or modify a selected style template (e.g., style template 202) to select different colors or color palettes, according to the user's preference.

In some implementations, style template 202 can include a style identifier attribute 218. For example, each preconfigured style template 202 can be assigned a unique identifier that can be used to identify a particular style template. The value associated with style identifier attribute 218 can correspond to the identifier for the corresponding style template. A storyboard template and/or storyboard project may be associated with a particular style template identifier so that media editing application 204 can use the style template identifier to quickly find the corresponding style template and associated attribute values.

Referring to FIG. 1, in some implementations, user device 102 can include storyboard templates database 108. For example, storyboard templates database 108 can include a various, different storyboard templates that define the recommended structure of a media project. When creating a media project (e.g., a video, movie, etc.), the user can select a storyboard template of a particular type or category that has a predefined (e.g., default) structure for creating a media project of the selected type or category. The user can modify or edit various attributes or elements of a selected storyboard template to customize the predefined storyboard template to the user's preferences. An example storyboard template data structure is illustrated in FIG. 3.

Figure 3:
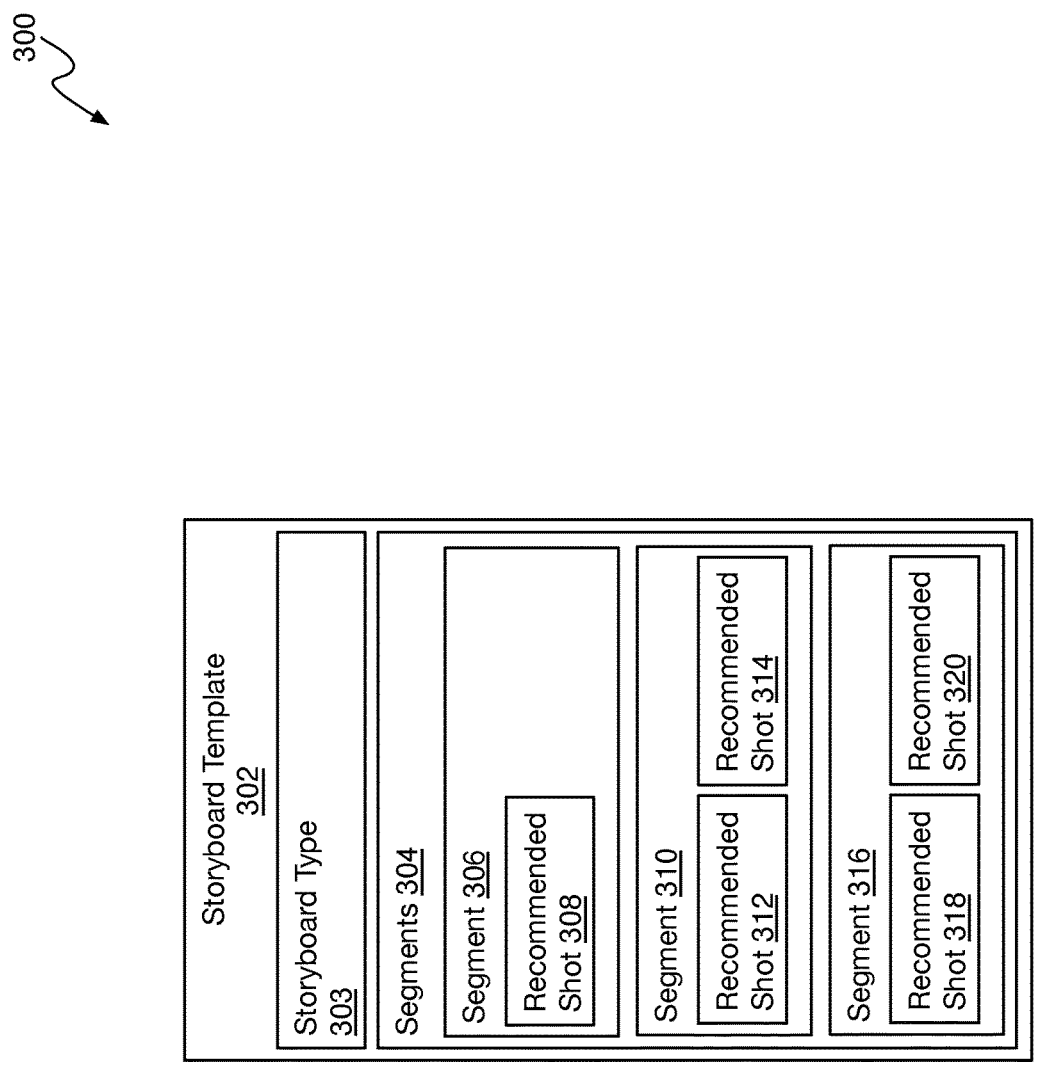
FIG. 3 is a block diagram of an example storyboard template data structure.

FIG. 3 is a block diagram of an example storyboard template data structure 300. For example, storyboard template data structure 300 can be used to define a variety of different storyboard templates, including storyboard template 302.

In some implementations, storyboard template 302 can include storyboard type attribute 303. For example, storyboard type attribute can have a corresponding value that identifies a type, or category, corresponding to storyboard template 302. Storyboard template types can include cooking, do-it-yourself, gaming, makeover, product review, and other categories of storyboard templates. Each type of storyboard template can be used to create different types of media projects. For example, the cooking type of storyboard may be selected when the user wishes to create a cooking tutorial video. The product review type of storyboard may be selected when the user wishes to create a product review video. Each of the different types of storyboard templates may be preconfigured with different structural elements (e.g., sections, clips, shots, etc.) and different sequences of structural elements that are recommended for the respective storyboard templates.

In some implementations, storyboard template 302 can include storyboard segments 304. For example, segments 304 can include a recommended (e.g., predefined, curated) selection of storyboard segments (e.g., clip groupings, project chapters, video chapters, video shot groupings, etc.) for the storyboard type associated with storyboard template 302 and identified by storyboard type attribute 303. Segments 304 can include a recommended sequence of storyboard segments (e.g., segment 306, segment 310, segment 316). For example, a storyboard segment can have attributes, such as type, description, and one or more recommended shots. Storyboard segment types can include introduction, overview, preview, equipment, step, finish, reveal, close, setup, big reveal, before and after, and others depending on the storyboard type. The segment description can include a textual description of the type, or purpose, of the corresponding storyboard segment and/or how the user should use the corresponding segment.

Each storyboard segment (e.g., storyboard segment 306, 310, 316, etc.) can include one or more recommended shots (e.g., recommended shot 308, 312, 314, 318, 320, etc.). The recommended shots for each storyboard segment can represent a recommended sequence of video clips for the corresponding storyboard segment. Each of the recommended shots for a storyboard segment can represent different recommended perspectives for shooting, or capturing, the video for the corresponding storyboard segment. For example, recommended shot 308 may correspond to a "title over background" video for segment 306 that corresponds to an "introduction" storyboard segment. Storyboard segment 310 may correspond to a "equipment review" segment and may include a recommended sequence of recommended shots 312 and 314 that provide different perspectives (e.g., wide view shot, close-up shot, etc.) of the equipment used in a cooking tutorial video, for example. Storyboard segment 316 can correspond to a step in the cooking process of the cooking tutorial video and may include recommended shot 318 corresponding to a wide view shot followed by recommended shot 320 corresponding to a picture-in-picture shot that includes both a wide view shot of the tutorial presenter, and a close-up shot of a specific cooking technique.

Each recommended shot can include attributes describing the recommended shot, including a shot type identifier (e.g., close-up, wide view, medium shot, picture-in-picture, etc.), a shot type description (e.g., text describing the recommended shot and its purpose or use), a recommended shot duration (e.g., a recommended length for the shot), and/or default media. For example, the default media can be preconfigured video or still image representing the shot type of the corresponding recommended shot. The default media may be presented to the user on a display of user device 102 when the corresponding storyboard is presented. The user may replace the default media with user-selected media when using the storyboard template to create a storyboard media project, as described further below.

Referring back to FIG. 1, in some implementations, user device 102 can include media library database 110. For example, media library database 110 can include audio, video, and/or still image media stored on user device 102. Media library database 110 can correspond to the user's media library, for example. The user can select media items from media library 110 to include in a storyboard project, as described further below.

In some implementations, user device can include user projects database 112. For example, when the user has created a media project (e.g., a storyboard project) using media editing application 104, media editing application 104 can store the user's media project in user projects database 112. User projects database 112 can include a variety of different media projects, such as project 402 of FIG. 4.

Figure 4:
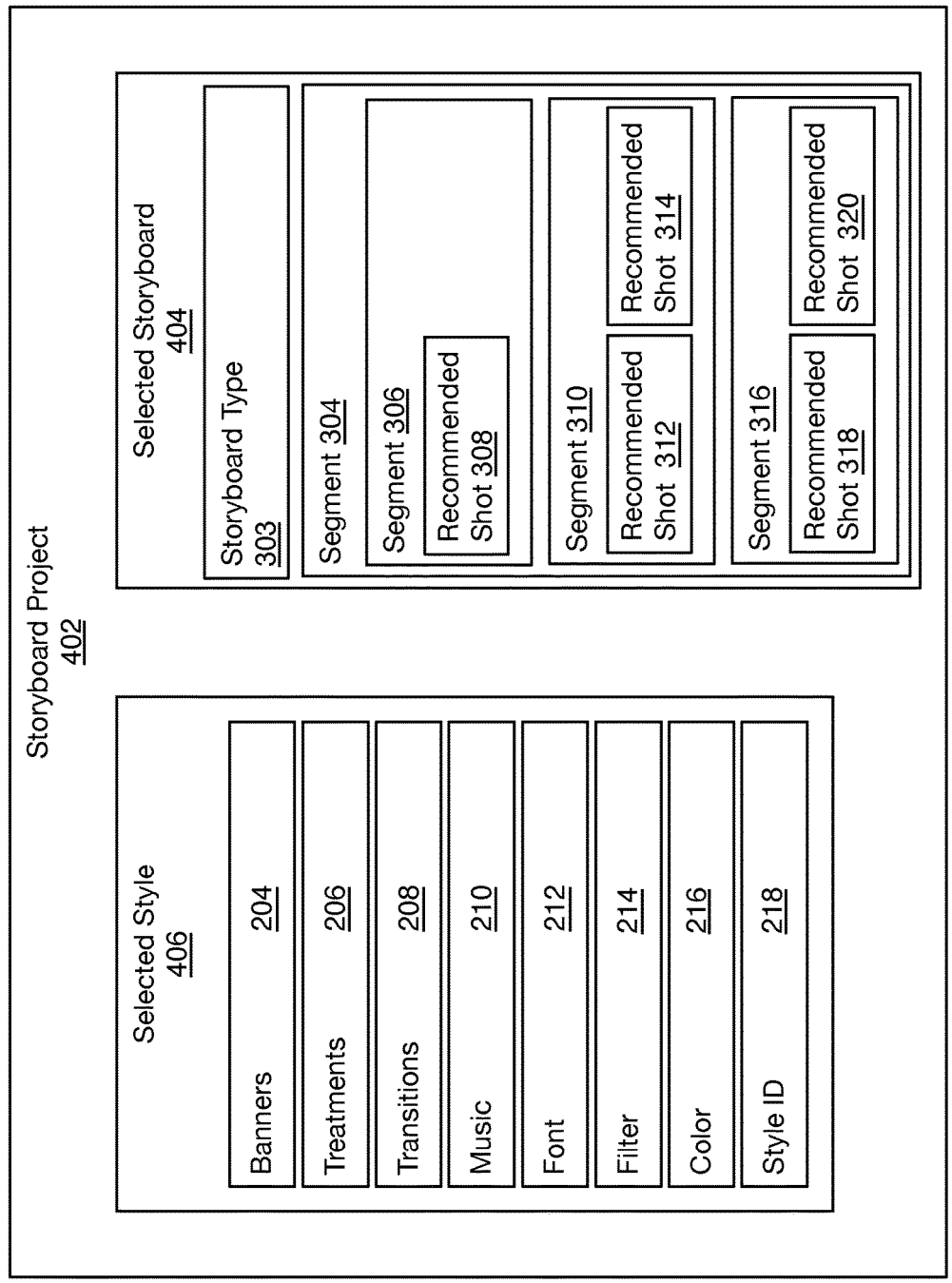
FIG. 4 is a block diagram of an example data structure for a storyboard project.

FIG. 4 is a block diagram of an example data structure 400 for storyboard project 402. For example, storyboard project 402 can include a user selected storyboard template 404. Storyboard template 404 can correspond to storyboard template 302 but may include user selected media, segments, and/or shots instead of the default media, segments, and/or shots included in the preconfigured storyboard template. Storyboard project 402 may include a user selected style template 405. Selected style template 406 can correspond to style template 202 but may include user selected style attributes instead of the default style attributes. When presenting storyboard project 402, or generating the final media product for storyboard project 402, media editing application 104 can apply the style attributes (e.g., user selected or default) of selected style 406 to the media (e.g., video, still image, audio tracks, etc.) defined by selected storyboard 404 to create a media product (e.g., video, movie, clip, preview, etc.) that has the structure (e.g., segment sequence, shot sequence, shot types, etc.) defined by selected storyboard 404 and the style elements defined by selected style 406.

Referring back to FIG. 1, system 100 can include server device 130. For example, server device 130 can be a network computing device that hosts various processes and/or services accessible to user device 102 through network 120 (e.g., wide area network, local area network, wifi network, cellular data network, the Internet, etc.).

In some implementations, server device 130 can include application configurator server 132. For example, application configurator server 132 can be a software server configured to serve configuration data to media editing application 104. Media editing application 104 can, for example, request storyboard templates and/or style templates from application configurator 132 through network 120. In response to the request, application configurator server 132 can obtain storyboard templates (e.g., storyboard template 302) from storyboard template database 138 and/or style templates (e.g., style template 202) from style templates database 136 and send the storyboard templates and style templates to media editing application 104. Upon receipt of the style templates and/or storyboard templates, media editing application 104 can store the received style templates and/or storyboard templates in style template database 106 and/or storyboard template database 108, respectively.

Figure 5:
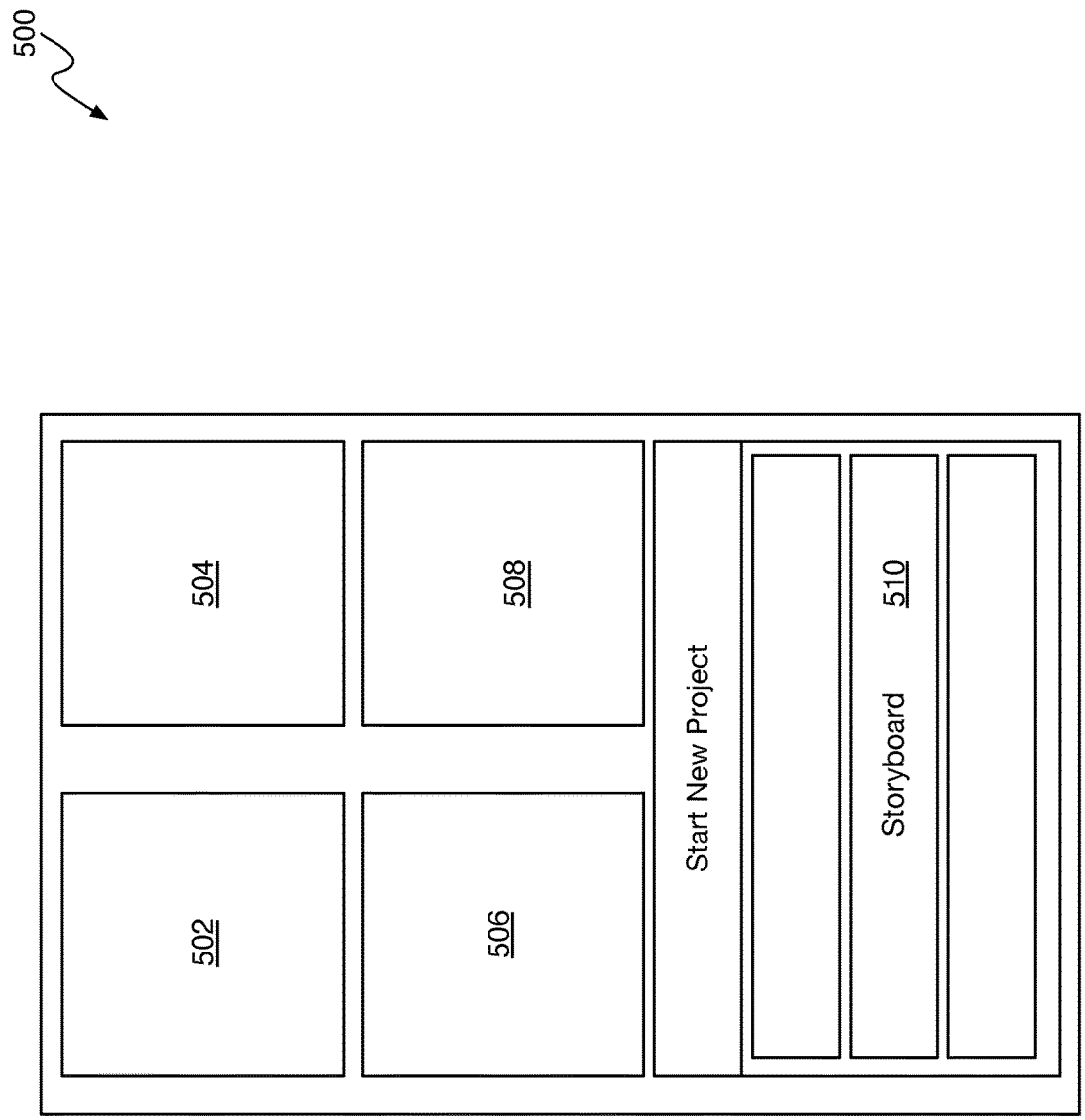
FIG. 5 illustrates an example graphical user interface for selecting a media project.

FIG. 5 illustrates an example graphical user interface 500 for selecting a media project. For example, graphical user interface (GUI) 500 can be presented by media editing application 104 when media editing application 104 is invoked by the user of user device 102.

In some implementations, GUI 500 can present user media projects. For example, GUI 500 can present representations (e.g., images, thumbnails, etc.) of existing user media projects 502, 504, 506, 508, etc. The existing media projects can be stored locally on user device 102 in user projects database 112 or may be stored on a network device accessible remotely from user device 102. The existing media projects can include previously created storyboard media projects, for example. The user can select an existing media project presented on GUI 500 to open the existing media project for editing (e.g., using GUI 800) and/or playback (e.g., using GUI 800, GUI 2500, etc.).

In some implementations, GUI 500 can present graphical object 510 for initiating the creation of a new storyboard media project. For example, graphical object 510 can be a button, menu item, or other affordance that the user can select to initiate the creation of a new storyboard media project. In response to receiving user input selecting graphical object 510, media editing application 104 can present GUI 600 of FIG. 6.

Figure 6:
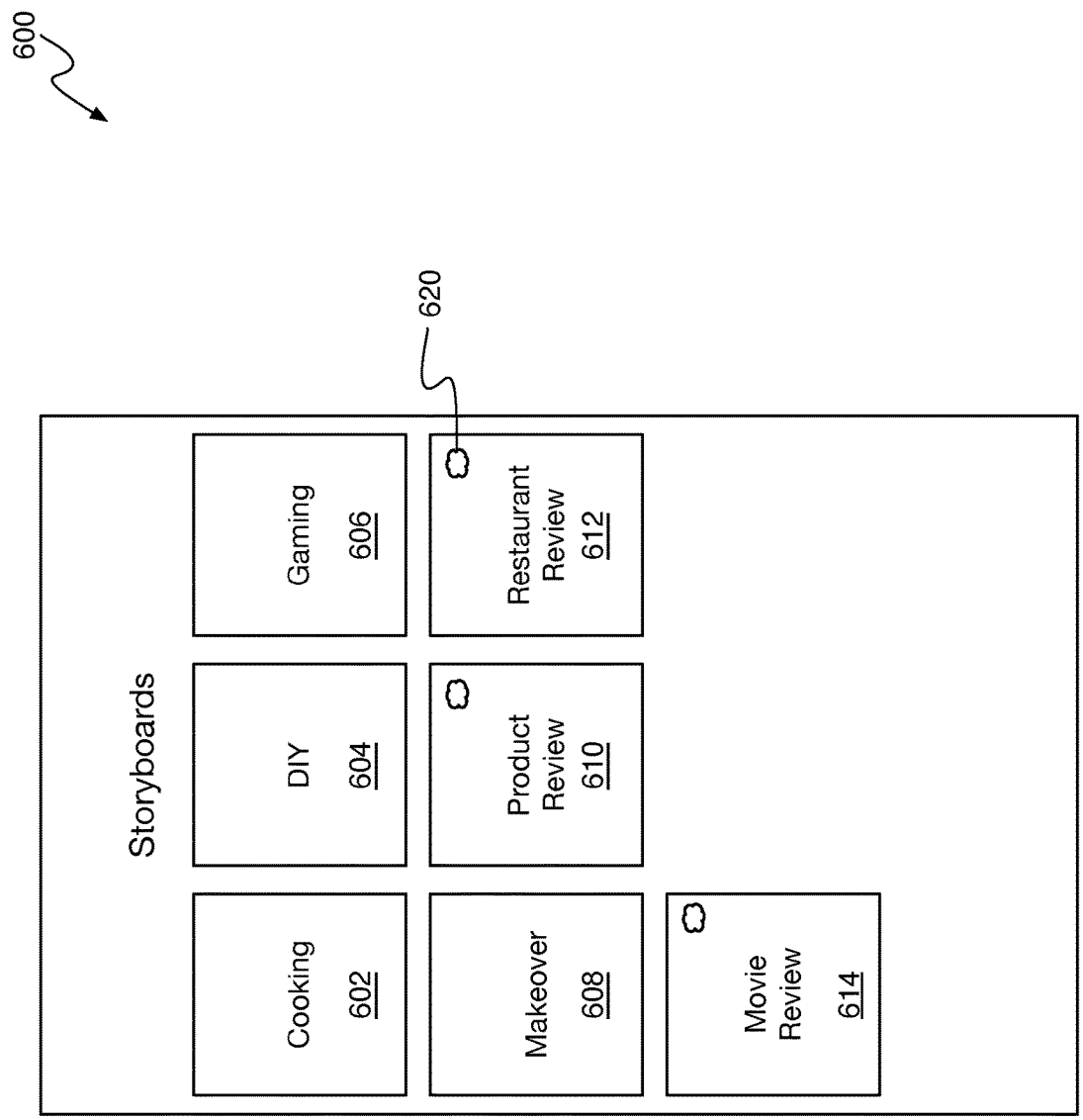
FIG. 6 illustrates an example graphical user interface for selecting a storyboard template.

FIG. 6 illustrates an example graphical user interface 600 for selecting a storyboard template. For example, GUI 600 can be presented by media editing application 104 in response to receiving user input selecting graphical object 510 of FIG. 5.

In some implementations, GUI 600 can present media storyboard templates accessible to media editing application 104. For example, GUI 600 can present graphical objects (e.g., images, thumbnails, animations, video clips, etc.) representing the various media storyboard templates (e.g., storyboard template 302) accessible to media editing application 104. The storyboard graphical objects 602-614 presented on GUI 600 can represent different types or categories of storyboard templates specifically configured to aid the user in the creation of different types (e.g., categories, topics, etc.) of content. For example, a "cooking tutorial" storyboard graphical object 602 may present an image related to, or representative of, the cooking topic. A "makeover tutorial" storyboard graphical object 608 may present an image related to, or representative of, the makeover topic.

The storyboard template graphical objects can represent storyboard templates stored locally on user device 102 (e.g., stored in storyboard template database 108) and/or storyboard templates stored remotely (e.g., stored in storyboard template database 138 on server device 130). When a storyboard template graphical object represents a remotely stored storyboard template that is not currently stored on user device 104, the storyboard template graphical object (e.g., object 612) can include an indicator (e.g., indicator 620) indicating that the corresponding storyboard template is available from a remote source (e.g., server device 130). The user can select indicator 620 to cause media editing application 104 to download the corresponding storyboard template (e.g., the restaurant review storyboard template) from the remote source.

In some implementations, media editing application 104 can receive user input selecting a storyboard template graphical object. For example, if the user of user device 104 wishes to create a media project related to gaming (e.g., video games, game reviews, video game strategy, etc.), the user may select graphical object 606 corresponding to the "gaming" storyboard template type. If the user wishes to create a media project related to restaurant reviews, the user may select graphical object 612 corresponding to the "restaurant review" storyboard template type. The selected storyboard template will be presented to the user to guide the user through the creation and/or editing of the new storyboard media project, as described further below.

Figure 7:
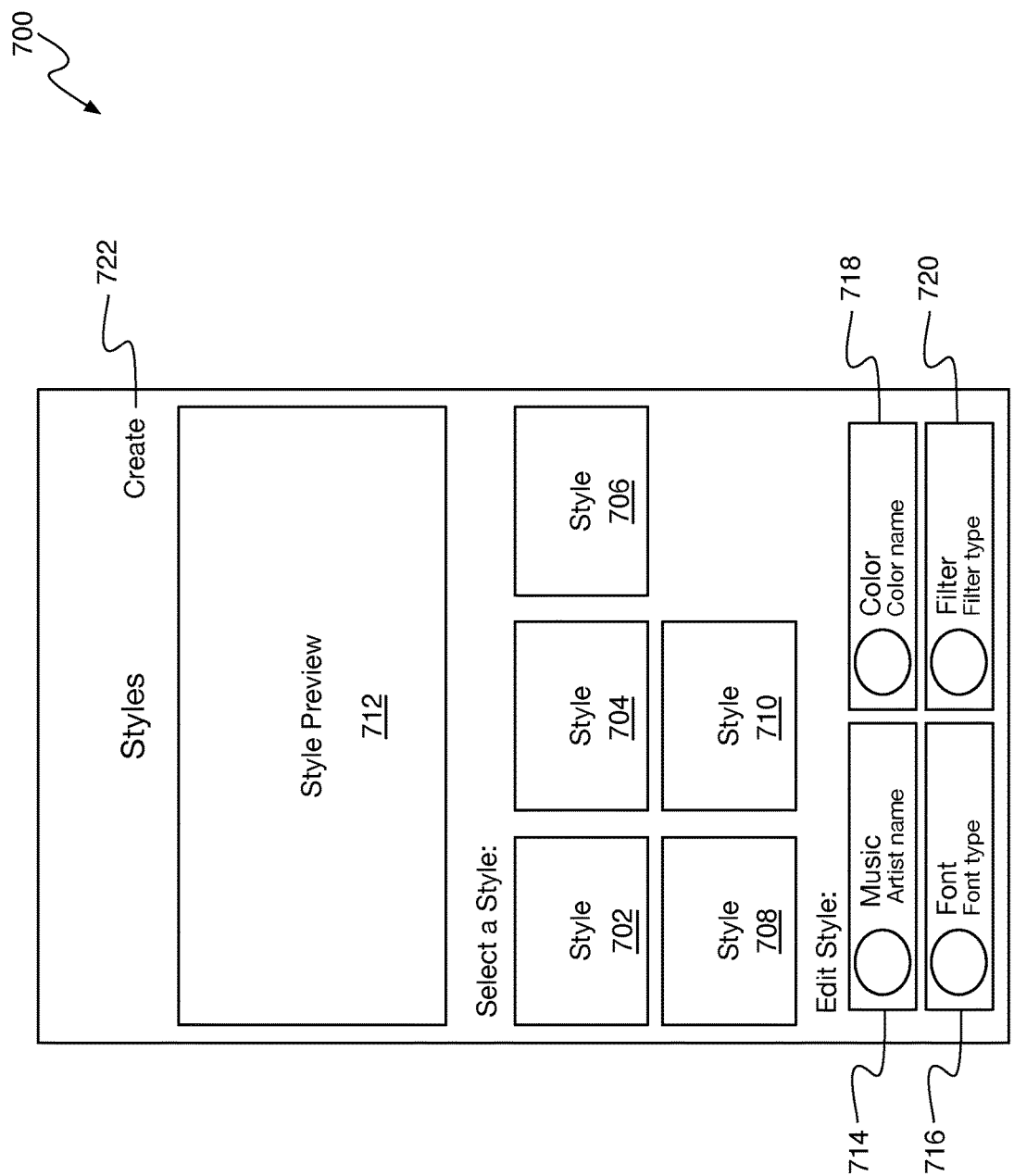
FIG. 7 illustrates an example graphical user interface for selecting a style to be applied to a media project.

FIG. 7 illustrates an example graphical user interface 700 for selecting a style to be applied to a media project. For example, in response to receiving the user selection of a storyboard template type, media editing application 104 can present GUI 700.

In some implementations, GUI 700 can present representations of the various predefined styles (e.g., style templates) available to the user for selection for a storyboard media project. For example, GUI 700 can present graphical objects 702-710 that represent the various style templates from which the user may select a style for the user's storyboard media project. The styles can include black and white, notepad, poster, fun, editorial, modern, or other styles that define a unique combination of style template attributes corresponding to the style type. Graphical objects 702-710 may present images, including colors, fonts, image filters, image effects, etc., representing their respective styles. Each style template (e.g., style template 202) can have a different predefined selection of style attributes than other style templates presented by GUI 700. Thus, style representation 704 may have a different appearance than style representation 708.

In some implementations, media editing application 104 can receive a user selection of a style template. For example, the user may select one of the style template representations 702-710 presented on GUI 700 to indicate which of the presented styles the user would like to apply to the storyboard media project the user is in the process of creating. In response to the user selection of a style template (e.g., style template 202), media editing application 104 can present a style preview 712 on GUI 700. For example, style preview 712 can be a video or still image that allows the user to preview the various attributes (e.g., banners, treatments, fonts, colors, etc.) of the selected style template.

In some implementations, media editing application 104 can receive user input for editing a selected style template (e.g., style template 202). For example, GUI 700 can present graphical objects 714-720 representing various editable attributes of the selected style template.

In some implementations, user can select graphical object 714 to change the background music associated with the selected style (e.g., style template 202). For example, in response to receiving a selection of graphical element 714, media editing application 104 can present a music selection graphical user interface (not shown) that presents music tracks accessible to media editing application 104 (e.g., locally in the user's media library 110, accessible through a remote network source, etc.). The user can select one or more of the presented music tracks to change the background music for the selected style template to the selected music track. The selected, or default, music track can be identified on graphical object 714.

In some implementations, user can select graphical object 716 to change the font associated with the selected style (e.g., style template 202). For example, in response to receiving a selection of graphical element 716, media editing application 104 can present a font selection graphical user interface (not shown) that presents fonts accessible to, or configured for, media editing application 104. The user can select one or more of the presented fonts, font sizes, font colors, or other font attributes, to change the font for the selected style template to the selected font. The selected, or default, font type can be identified on graphical object 714.

In some implementations, user can select graphical object 718 to change the color, or color palette, associated with the selected style (e.g., style template 202). For example, in response to receiving a selection of graphical element 718, media editing application 104 can present a color selection graphical user interface (not shown) that presents colors, or color palettes, accessible to, or configured for, media editing application 104. The user can select one or more of the presented colors, or color palettes, to change the color scheme for the selected style template to the selected color, or color palette. The selected, or default, color (e.g., color palette, color scheme, etc.) can be identified on graphical object 714.

In some implementations, user can select graphical object 720 to change the image filter (e.g., image filter, image effect, etc.) associated with the selected style (e.g., style template 202). For example, in response to receiving a selection of graphical element 720, media editing application 104 can present a image filter selection graphical user interface (not shown) that presents various image filters, or image effects, accessible to, or configured for, media editing application 104. The user can select one or more of the presented image filters, or image effects, to change the image filter for the selected style template to the selected image filter, or image effect. The selected, or default, image filter (e.g., image effect) can be identified on graphical object 714.

In some implementations, style preview 712 can be dynamically updated to reflect user edits to the selected style template. For example, as the user selects different music tracks, font types, color schemes, and/or image filter options, style preview 712 can be dynamically updated in real-time, or near real-time, to reflect the changes to the selected style template. Thus, banners, text, treatments, music, and/or other media presented by style preview 712 can be dynamically changed by media editing application 104 in response to user input editing various style attributes.

In some implementations, GUI 700 can include graphical object 722 for creating a new storyboard media project based on the selected storyboard template and the selected style template. For example, in response to receiving user input selecting graphical object 722, media editing application 104 can generate a new storyboard media project (e.g., storyboard project 402) and present graphical user interface 800 of FIG. 8 to allow the user to edit the storyboard media project.

Figure 8:
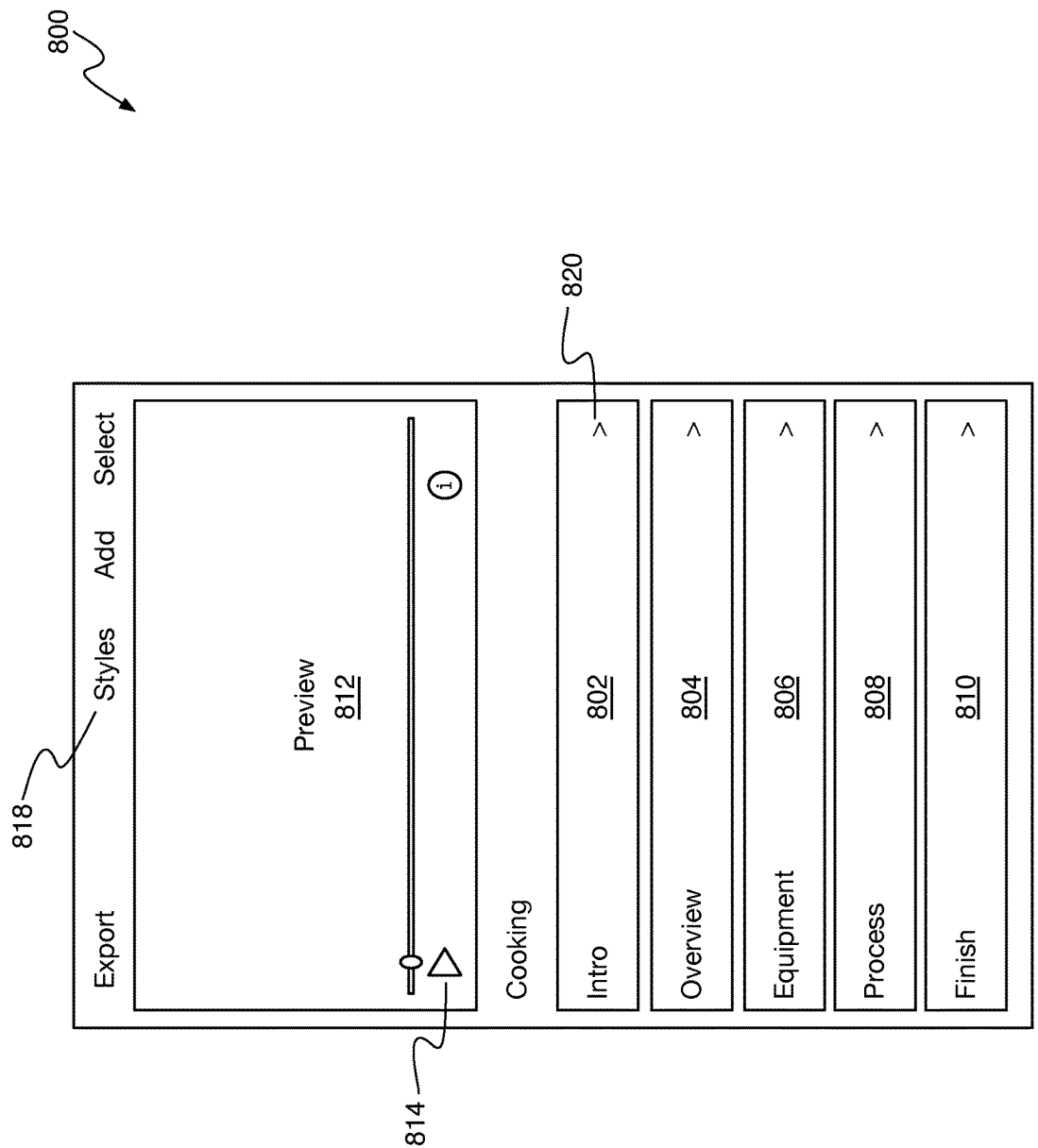
FIG. 8 illustrates an example graphical user interface for editing a storyboard media project.

FIG. 8 illustrates an example graphical user interface 800 for editing a storyboard media project. For example, in response to receiving user input selecting graphical object 722, media editing application 104 can present graphical user interface 800 so that the user can edit the new storyboard media project. Alternatively, media editing application 104 can present GUI 800 in response to receiving user input selecting a representation of an existing storyboard media project (e.g., graphical object 506) presented on GUI 500.

In some implementations, GUI 800 can present representations of the structure of a storyboard media project. For example, GUI 800 can present graphical elements 802-810 representing the sequence of media segments suggested by the selected storyboard template. For a cooking storyboard template, for example, GUI 800 can present an introduction segment 802, an overview segment 804, an equipment review segment 806, a cooking process segment 808, and/or a finish segment 810. For a cooking storyboard template, for example, GUI 800 can present an introduction segment 802, an overview segment 804, an equipment review segment 806, a cooking process segment 808, and/or a finish segment 810. For a makeover storyboard template, for example, GUI 800 can present a preview segment, a setup segment, an early process segment, a late process segment, a big reveal segment, and/or a before and after segment. These recommended segments can guide the user, or instruct the user, on the proper order (e.g., best practices, commonly understood arrangements, etc.) of segments and/or the media content appropriate for each segment.

In some implementations, GUI 800 can include a media preview 812. For example, media preview 812 can playback selected storyboard segments, selected media clips (e.g., video shots), and/or audio tracks (e.g., voiceover tracks, background music, etc.) for selected segments and/or video clips. When playing back the selected storyboard segments and/or selected media clips (e.g., in response to user selection of play control 814), media editing application 104 can apply the selected style template attributes to the video preview so that the user can see how the storyboard segments and/or media clips will appear with the selected style applied to the video. The style template attributes can be applied to the video preview dynamically during, or immediately before, the playback of the preview. The style template attributes can be dynamically applied to the video preview of individual segments and/or individual media clips as the segments and/or media clips are added to the storyboard media project. Thus, media editing application 104 does not need to render the final media product (e.g., movie, video, etc.) including all segments and/or clips of the storyboard media project before the user can see how the selected style template will appear during playback of the storyboard media project.

In some implementations, GUI 800 can include graphical object 818 for changing the style template selected for the storyboard media project. For example, in response to receiving user input selecting graphical object 818, media editing application 104 can present GUI 700, or similar graphical user interface so that the user can select and/or edit a different style template than the style template presently associated with the storyboard media project presented by GUI 800. For example, instead of presenting graphical object 722 for creating a new storyboard media project, GUI 700 can present a graphical object that when selected by the user applies the newly selected style template to the existing storyboard media project presented by GUI 800.

In some implementations, each storyboard media segment representation (e.g., segment representations 802, 804, 806, 808, 810, etc.) can include a graphical object (e.g., graphical object 820) that can be selected by the user to expand and/or minimize the corresponding storyboard segment. For example, as illustrated by FIG. 8, each storyboard segment representation 802, 804, 806, 808 and 810 is presented in a minimized representation. However, the user may select graphical object 820 to expand the corresponding storyboard segment representation such that the recommended media shots (e.g., video clips, video shots, video shot recommendations, shot descriptions, etc.) for the corresponding storyboard segment can be seen grouped within the storyboard segment representation, as illustrated by FIG. 9.

Figure 9:
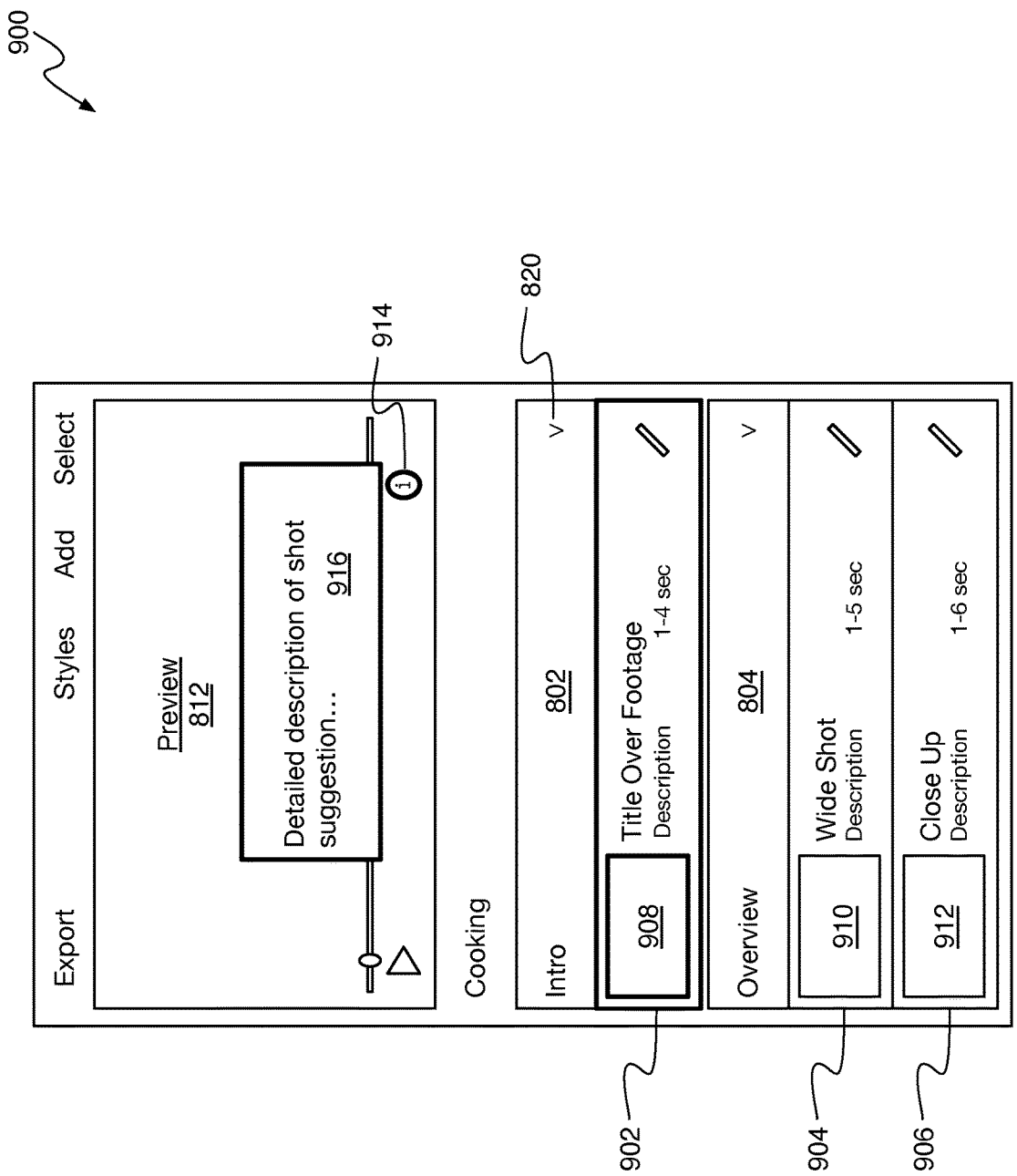
FIG. 9 illustrates an example graphical user interface for presenting recommended media shots for a storyboard media project.

FIG. 9 illustrates an example graphical user interface 900 for presenting recommended media shots for a storyboard media project. For example, GUI 900 can correspond to GUI 800. GUI 900 can present graphical representations of the structural elements (e.g., recommended segments, recommended shots, etc.) of a selected storyboard template and/or representations user-selected media items that the user has selected for the various shots included in the storyboard media project.

In some implementations, GUI 900 can include recommended segment 802 (e.g., an introduction segment) and/or recommended segment 804 (e.g., an overview segment). As described above, the user can select graphical object 820 to cause media editing application 104 to expand the graphical representations of segments 802 and/or 804 to reveal graphical representations 902, 904, 906, etc. of the recommended shots for each segment 802 and 804. The recommended shot representations are presented within each recommended segment representation in a recommended sequence, as specified by the selected storyboard template.

In some implementations, each recommended shot representation 902, 904, 906 can include an image (e.g., image 908, 910, 912) representing the media clip (e.g., video clip, still image, etc.) currently associated with the corresponding recommended shot. If the user has not yet selected a media clip for a particular recommended shot (e.g., shot 904), media editing application 104 may present a default image (e.g., image 910) for the recommended shot. If the user has selected a media clip for a particular recommended shot (e.g., shot 902), media editing application 104 can present an image (e.g., image 910) representative of the selected media clip (e.g., a thumbnail image derived from the selected media clip) for the recommended shot.

In some implementations, recommended shot representations (e.g., representations 902, 904, 906, etc.) can include a title or name for the corresponding recommended shot. For example, the name of a recommended shot can be descriptive of the type of media clip (e.g., video clip, still image, etc.) recommended for the corresponding shot (e.g., title over footage, wide shot, close-up, medium shot, etc.). Recommended shot representations can include a short description (e.g., single sentence, short phrase, etc.) of the recommended shot. Recommended shot representations can include a recommended duration (e.g., 1-4 seconds, 3-8 seconds, etc.) for the recommended shot.

In some implementations, GUI 900 can include graphical object 914 for invoking a detailed description of a shot suggestion. For example, when a user has selected a recommended shot representation (e.g., shot representation 902) and subsequently selects graphical object 914, media editing application 104 can present graphical object 916 (e.g., a window, overlay, etc.) that presents a detailed description of the selected recommended shot. The detailed description of the recommended shot can describe what the content of the corresponding media (e.g., video, still image, etc.) should be and/or why the selected recommended shot is recommended for the corresponding storyboard segment (e.g., segment 802). The detailed description presented by graphical object 916 can be a much more detailed description than the brief shot description included in a recommended shot representation (e.g., shot representation 902) since graphical object 916 can provide more display area to present more text than shot representation 902.

In some implementations, a user can select a recommended shot representation to cause the corresponding media clip to be presented in preview area 812. For example, in response to the user selecting recommended shot representation 902, media editing application can present the media clip (e.g., default media clip, user-selected media clip) corresponding to recommended shot representation 902 in preview area 812. When presenting the preview of the media clip, media editing application 104 can apply the previously selected style template to the media clip preview so that the user can see how the media clip will appear when presented with the selected style attributes, as described above.

Figure 10:
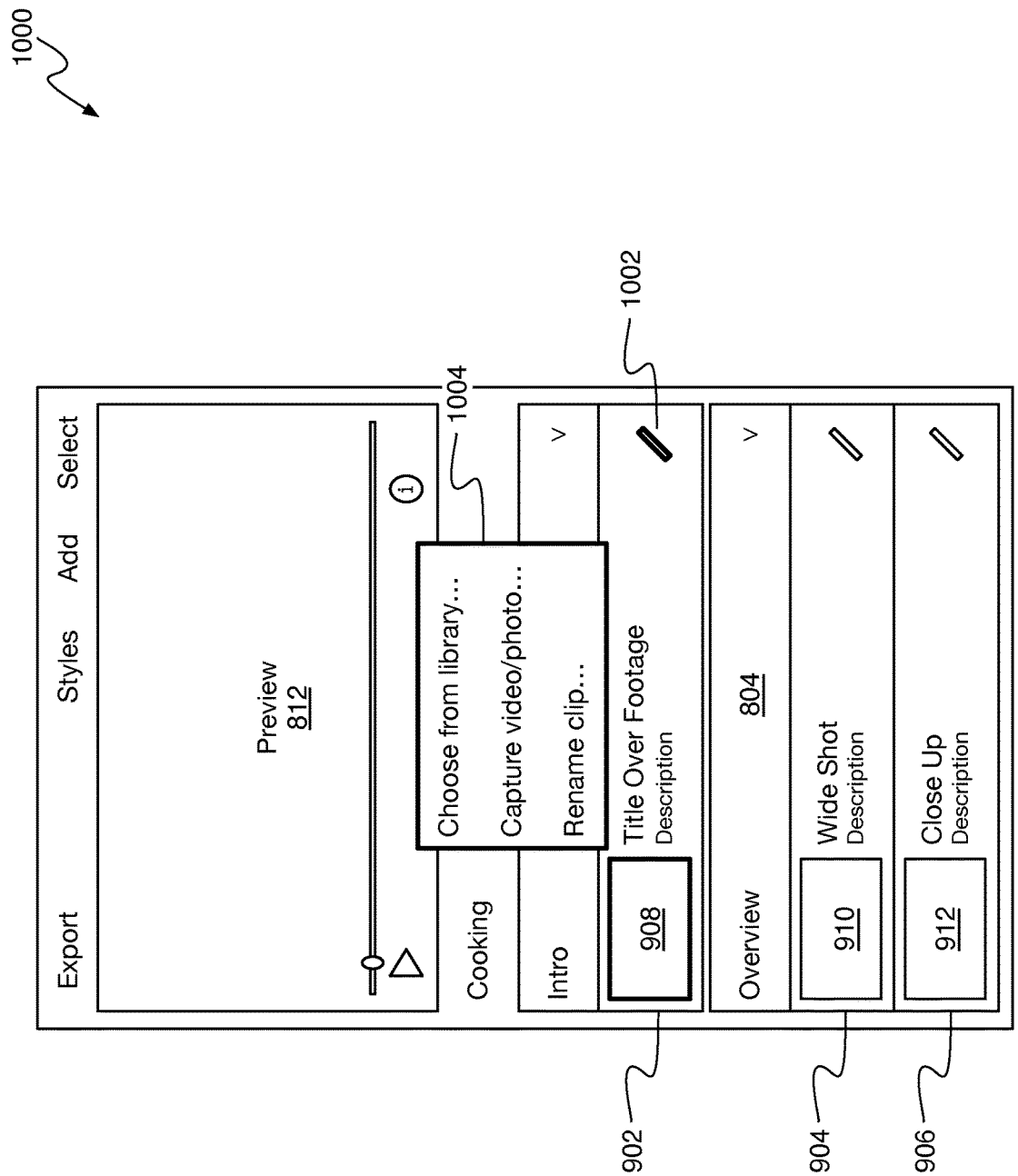
FIG. 10 illustrates an example graphical user interface for selecting a media clip for a recommended shot.

FIG. 10 illustrates an example graphical user interface 1000 for selecting a media clip for a recommended shot. For example, GUI 1000 can correspond to GUI 900 described above. In the example of GUI 1000, the user has yet to select a media clip for a recommended shot corresponding to recommended shot representation 902 presented on GUI 1000. In response to receiving user input selecting image 908 or graphical object 1002 corresponding to recommended shot representation 902, media editing application 104 can present graphical object 1004 (e.g., an options menu, overlay, affordance, etc.) that presents options for selecting a media clip for the recommended shot corresponding to recommended shot representation 902. For example, graphical object 1004 can present an option for selecting a media clip from the user's media library (e.g., local or remote). Graphical object 1004 can present an option for capturing a media clip using a camera and/or microphone of user device 102. The user can select one of the options (e.g., select from library, capture, etc.) to cause media editing application 104 to present respective graphical user interfaces (not shown) for selecting media from the user's library or capturing media using a camera and/or microphone of user device 102. After the selection or capture of a media clip, the media clip can be associated with the recommended shot corresponding to recommended shot representation 902.

In some implementations, graphical object 1004 can present an option for renaming a recommended shot. For example, graphical object 1004 can present a "rename clip" option that when selected by the user, causes media editing application 104 to present a text editor for the title associated with the corresponding recommended shot. For example, when recommended shot representation 902 is selected, selection of the rename clip option will allow the user to edit the recommended shot name "Title Over Footage" to some other user specified name.

Figure 11:
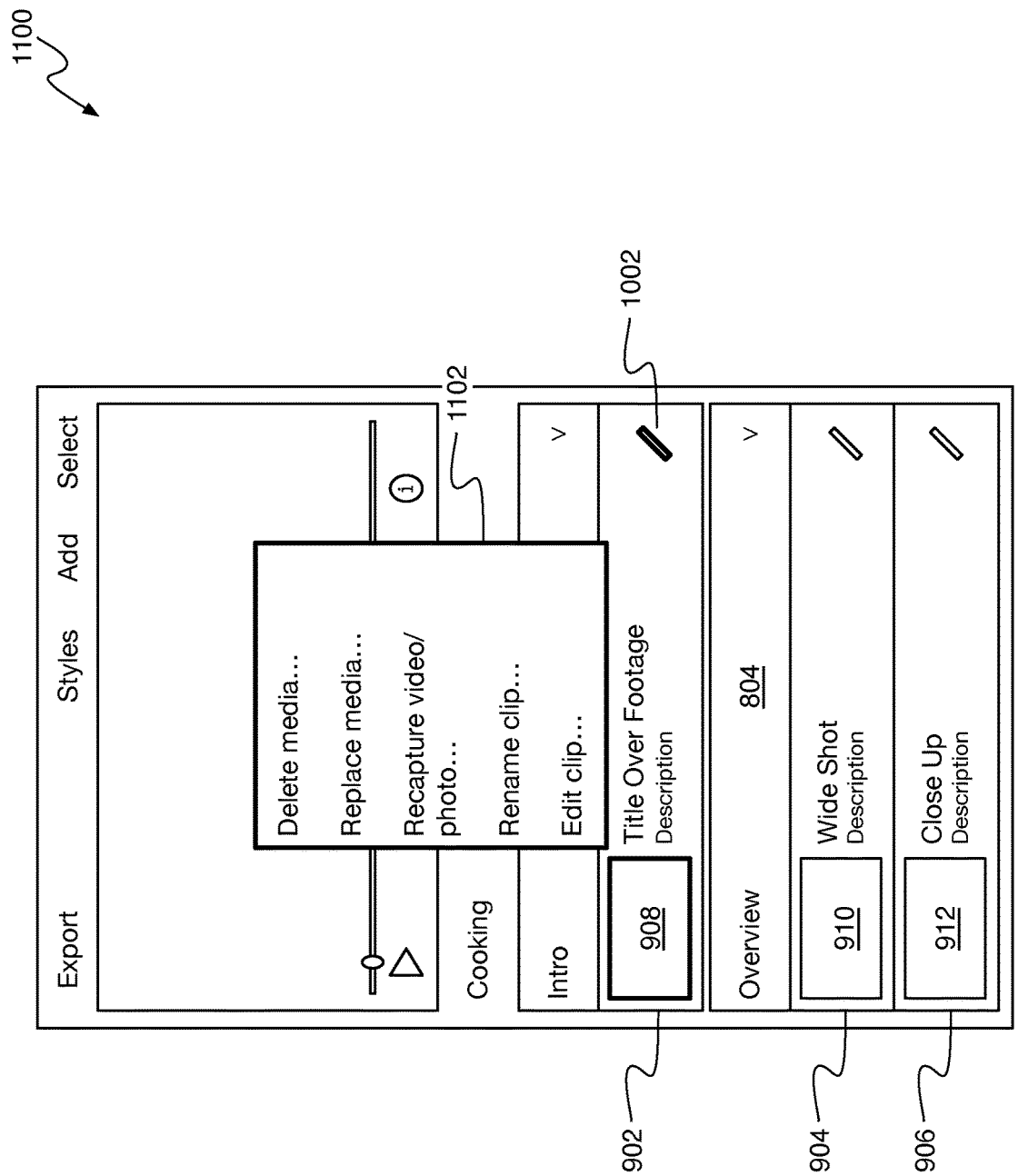
FIG. 11 illustrates an example graphical user interface for presenting options for modifying a user selected media clip.

FIG. 11 illustrates an example graphical user interface 1100 for presenting options for modifying a user selected media clip. For example, GUI 1100 can correspond to GUI 1000 described above. However, in the example of GUI 1100, the user has already selected a media clip for a recommended shot corresponding to recommended shot representation 902 presented on GUI 1100.

In some implementations, GUI 1100 can include graphical object 1102 that presenting options for modifying a user selected shot. As described above, a user can interact with GUI 1000 to select, or capture, a media clip and associate the media clip with a recommended shot of a storyboard media project. For example, the user selected media clip can be associated with a recommended shot represented by recommended shot representation 902. If the user wishes to select, or capture, a different shot for the recommended shot, the user can provide input selecting image 908 or graphical object 1002 to invoke graphical object 1102.

Graphical object 1102 can present a user selectable option for deleting the media item from the recommended shot. For example, in response to receiving user input selecting the delete option from graphical object 1102, media editing application 104 can delete the media item from the recommended shot and/or associate the recommended shot to the default media item for the recommended shot.

Graphical object 1102 can present a user selectable option for replacing the media item associated with the recommended shot. For example, in response to receiving user input selecting the replace option from graphical object 1102, media editing application 104 can present a graphical user interface (not shown) that allows the user to select a replacement media item for the recommended shot and/or associate the recommended shot with the replacement media item instead of the previously selected or captured media item.

Graphical object 1102 can present a user selectable option for recapturing the media item associated with the recommended shot. For example, in response to receiving user input selecting the replace option from graphical object 1102, media editing application 104 can present a graphical user interface (not shown) that allows the user to capture a replacement media item (e.g., take a new picture, record a new video, etc.) for the recommended shot and/or associate the recommended shot with the replacement media item instead of the previously selected or captured media item.

Graphical object 1102 can present a user selectable option for renaming the media item associated with the recommended shot. For example, in response to receiving user input selecting the rename option from graphical object 1102, media editing application 104 can present a text editor that allows the user to rename the user selected media item.

Graphical object 1102 can present a user selectable option for invoking an editing interface for editing the media item associated with the recommended shot. For example, in response to receiving user input selecting the edit option from graphical object 1102, media editing application 104 can present GUI 1200 of FIG. 12 described below.

Figure 12:
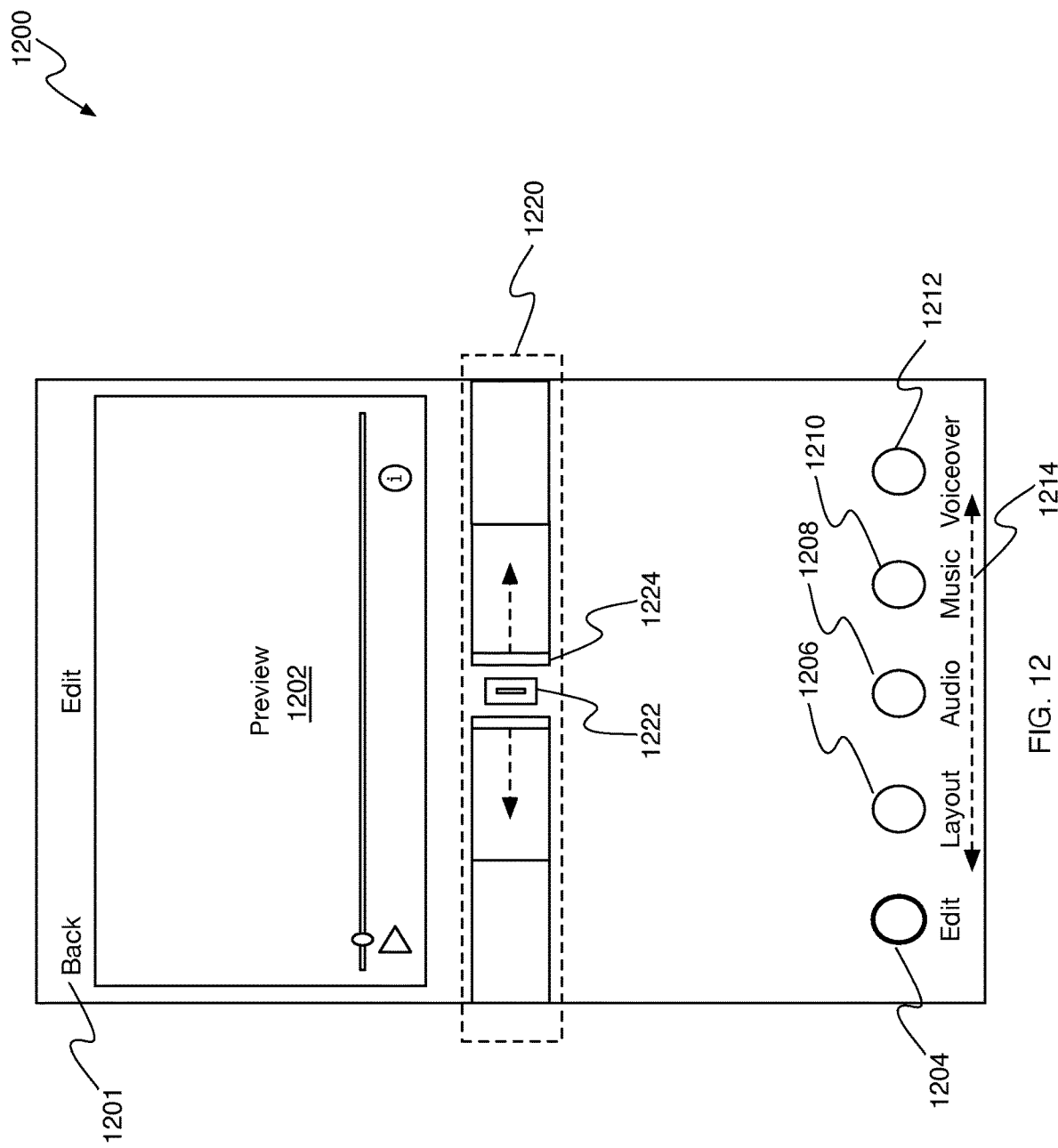
FIG. 12 illustrates an example graphical user interface for editing a media item associated with a recommended shot.

FIG. 12 illustrates an example graphical user interface 1200 for editing a media item associated with a recommended shot. For example, media editing application 104 can present GUI 1200 in response to the user selecting the media item editing option from graphical object 1102 of FIG. 11. Media editing application 104 can present GUI 800 or 900 in response to receiving user input selecting graphical object 1201.

In some implementations, GUI 1200 can include preview area 1202 that presents a preview of the media clip being edited through GUI 1200. For example, media editing application 104 can presenting the media clip in preview area 1202 without the style attributes defined for the selected style template. Media editing application 104 can present the media clip in preview area 1202 with the style attributes defined for the selected style template applied to the media clip such that the banners, treatments, colors, fonts, etc., associated with the selected style may be presented while the media clip is played back in preview area 1202.

In some implementations, GUI 1200 can include graphical objects 1204-1210 representing media item editing options. For example, media item editing options can include a video clip editing option 1204, a layout editing option 1206, an audio adjustment option 1208, and/or a voiceover option 1212. The user may provide input to cause media editing application 104 to scroll the media item editing options (as represented by dashed line 1214) to view other media editing options that may be currently hidden off screen (e.g., the replace and/or delete options referenced in FIG. 18).

When editing option 1204 is selected by the user, media editing application 104 can present media item timeline 1220 that presents a sequence of video frames corresponding to the media item currently being edited. The media item timeline 1220 can present graphical object 1222 representing a break, or cut, at a location in the sequence of video frames where the user has cut the corresponding media item. Media timeline 1220 can present graphical object 1224 at the cut edge of a sequence of video frames. Graphical object 1224 (e.g., an editing handle) can be manipulated by the user to trim the end of a sequence of video frames. For example, the user can select, hold, and drag graphical object 1224 (as indicated by the dashed arrows) along the sequence of frames from a cut end of the sequence of frames to a particular location in the sequence of frames to cause media editing application 104 to trim (e.g., delete, remove, hide, etc.) the frames between the cut end of the sequence of frames and the particular location in the sequence of frames.

Figure 13:
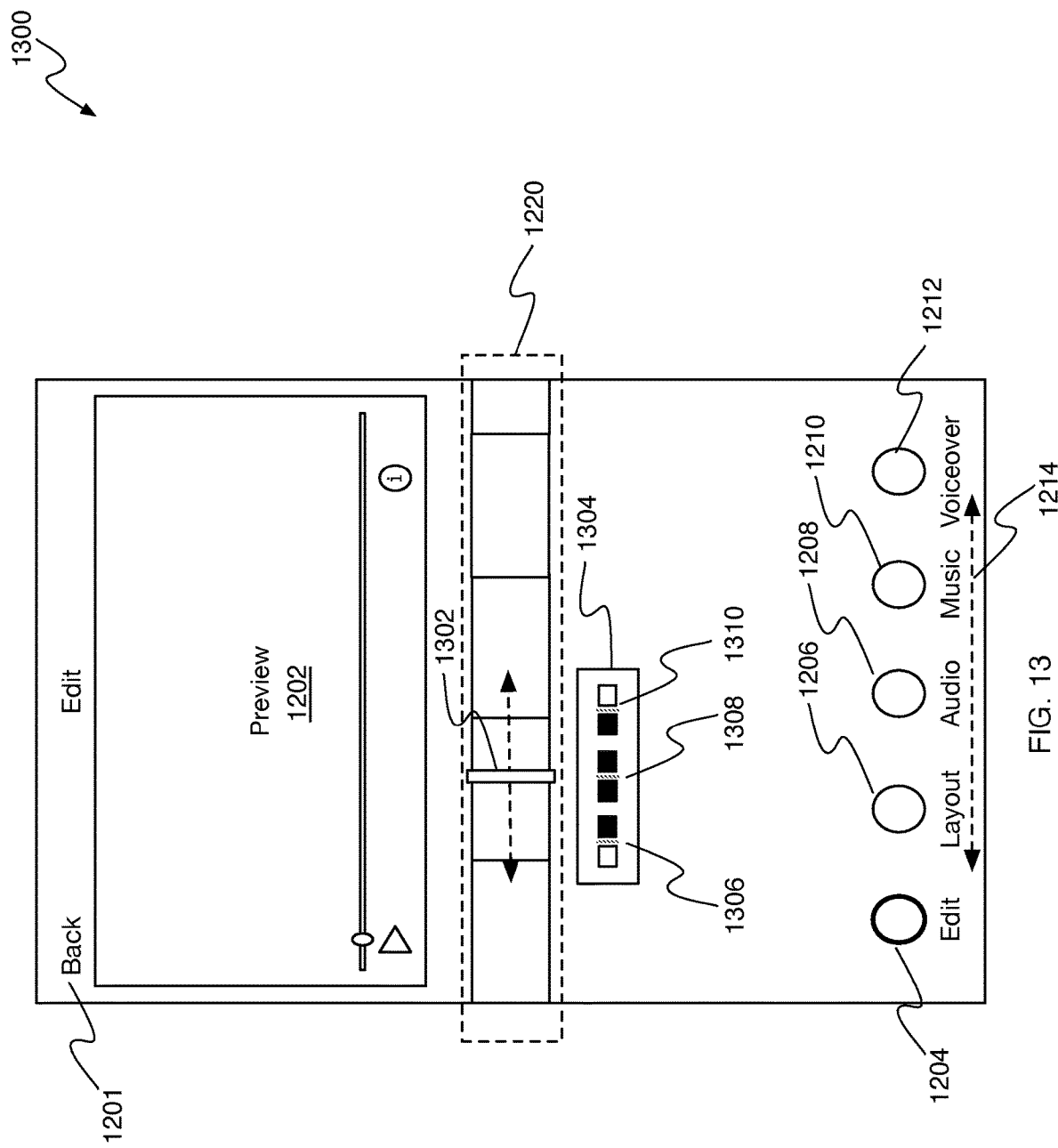
FIG. 13 illustrates an example graphical user interface for presenting an editing shortcut when editing a media item.

FIG. 13 illustrates an example graphical user interface 1300 for presenting an editing shortcut when editing a media item. For example, GUI 1300 can correspond to GUI 1200. As described above, GUI 1300 can include media item timeline 1220 that includes a sequence of frames from the media item being edited. In some cases, the sequence of frames can be very long. Thus, instead of requiring the user to scroll to a cut end of the sequence of frames to select an editing handle (e.g., handle 1224) at the end of the sequence of frames, in some implementations, the user may provide input (e.g., a select and hold input) at a selected location in the middle of the sequence of frames to cause media editing application 104 to present editing handle 1302 at the selected location. The user can select and drag editing handle 1302 along the sequence of frames to adjust the selected location.

When media editing application 104 presents editing handle 1302, media editing application 104 can also present graphical object 1304 that presents options for trimming and/or cutting the media item at the selected location.

In some implementations, graphical object 1304 can include graphical object 1306 representing a trim operation that removes, or hides, frames from the left side of the location of editing handle 1302. In response to receiving user input selecting graphical object 1306, media editing application 104 can remove, or hide, frames from the left side of the location of editing handle 1302 to the left side cut edge so that the frames will not appear when the media item is subsequently played back.

In some implementations, graphical object 1304 can include graphical object 1308 representing a cut operation that cuts the sequence of frames at the location of editing handle 1302 while preserving the frames on the left side and right side of the location of editing handle 1302. In response to receiving user input selecting graphical object 1308, media editing application 104 can cut the sequence of frames without removing, or hiding, any frames so that the frames will appear when the media item is subsequently played back.

In some implementations, graphical object 1304 can include graphical object 1310 representing a trim operation that removes, or hides, frames from the right side of the location of editing handle 1302. In response to receiving user input selecting graphical object 1310, media editing application 104 can remove, or hide, frames from the right side of the location of editing handle 1302 to the right side cut edge so that the frames will not appear when the media item is subsequently played back.

In some implementations, graphical objects 1306, 1308, and 1310 can have an appearance that allows the user to quickly identify frames that will be removed and/or preserved when the corresponding editing operation is performed. For example, graphical object 1306 representing a left side trim operation can be represented by an empty square on the left side of a cut line and a filled in square on the right side of the cut line. The empty square can represent frames that will be removed when the left side trim operation is performed. The filled in square can represent frames that will be preserved when the left side trim operation is performed. Similarly, graphical object 1308 representing the cut operation is represented by a filled in square on each side of the cut line since frames on both sides of the cut are preserved when performing the cut operation. Graphical object 1310 representing the right side trim operation can be represented by an empty square on the right side of a cut line and a filled in square on the left side of the cut line.

Figure 14:
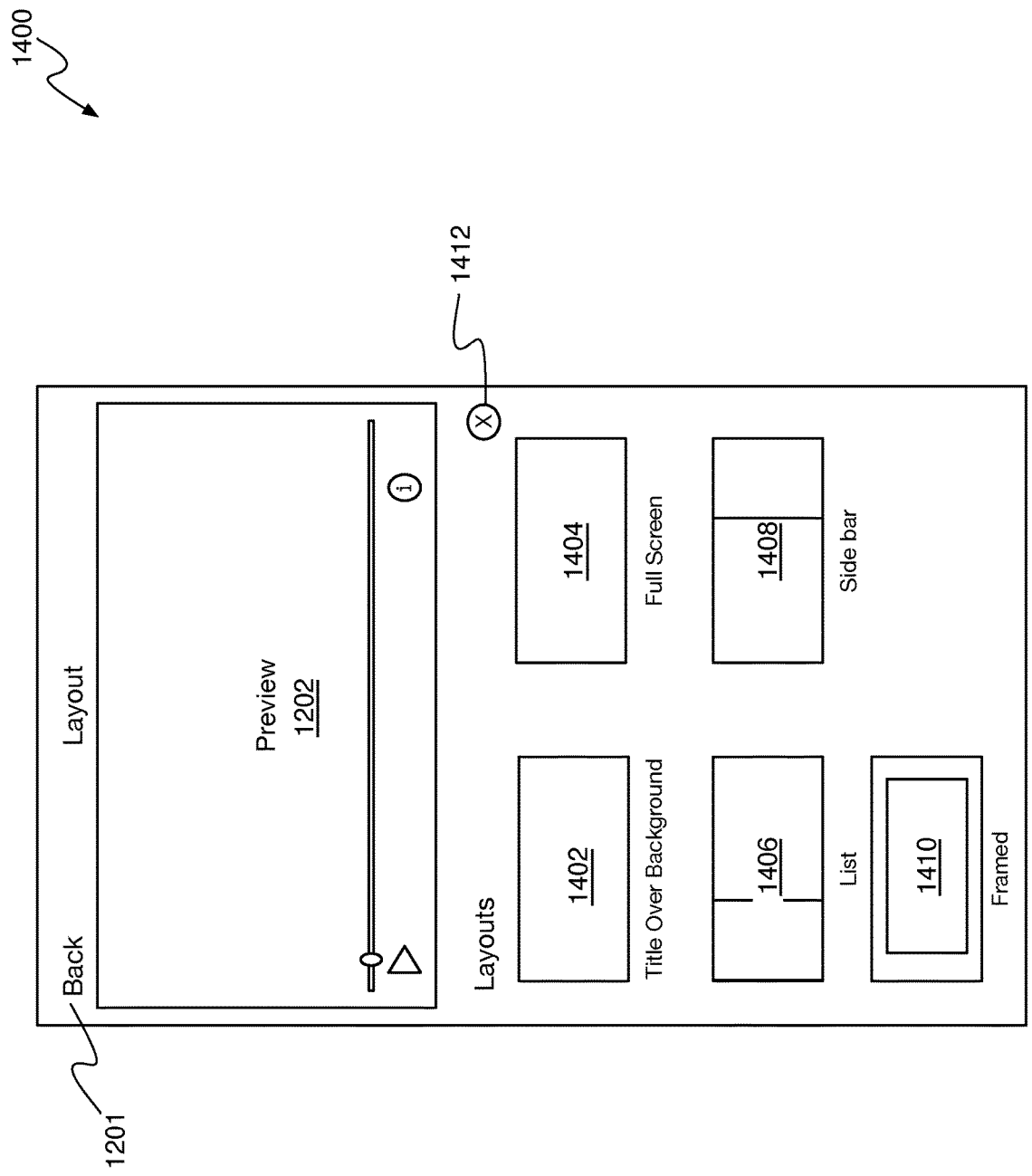
FIG. 14 illustrates an example graphical user interface for editing the layout of a media clip.

FIG. 14 illustrates an example graphical user interface 1400 for editing the layout of a media clip. For example, media editing application 104 can present GUI 1400 in response to the user selecting graphical object 1206 representing the layout editing option on FIG. 12 or FIG. 13.

In some implementations, GUI 1400 can present layout options for presenting the selected media item. For example, a layout can define how the selected media item is presented relative to other graphical objects that may be presented when playing back, or previewing, the selected media item. The layout options can include a "title over background" layout 1402 that presents a title banner and/or title text over the selected media item. The layout options can include a "full screen" layout 1404 that presents the selected media item such that the selected media item fills the entire display area (e.g., preview area 1202, entire display screen, display area allocated to a media playback application, etc.) allocated for playback of the selected media item. The layout options can include a "list" layout 1406 that presents a dedicated area on the left side of the playback display area for presenting a textual list and the selected media item on the right side of the playback display area. The layout options can include a "side bar" layout 1408 that presents a dedicated area on the right side of the playback display area for presenting a text and the selected media item on the left side of the playback display area. The layout options can include a "framed" layout 1410 that presents the selected media item framed by a border.

In some implementations, the appearance of the various layouts can be influenced by the selected style template for the storyboard media project. For example, when a layout includes graphical elements (e.g., banners, frames, sidebars, lists, and other elements) that are not included in the selected media item, media editing application 104 can render these graphical elements according to the style attributes of the style template selected for the storyboard media project, as described above. When the user invokes a preview of the media item in preview area 1202, media editing application 104 can render the media item in preview area 1202 using the selected layout and the selected style template attributes.

The user can exit the layout picker GUI 1400 by selecting graphical object 1412. For example, in response to receiving user input selecting graphical object 1412, media editing application 104 can present GUI 1200 or GUI 1300.

Figure 15:
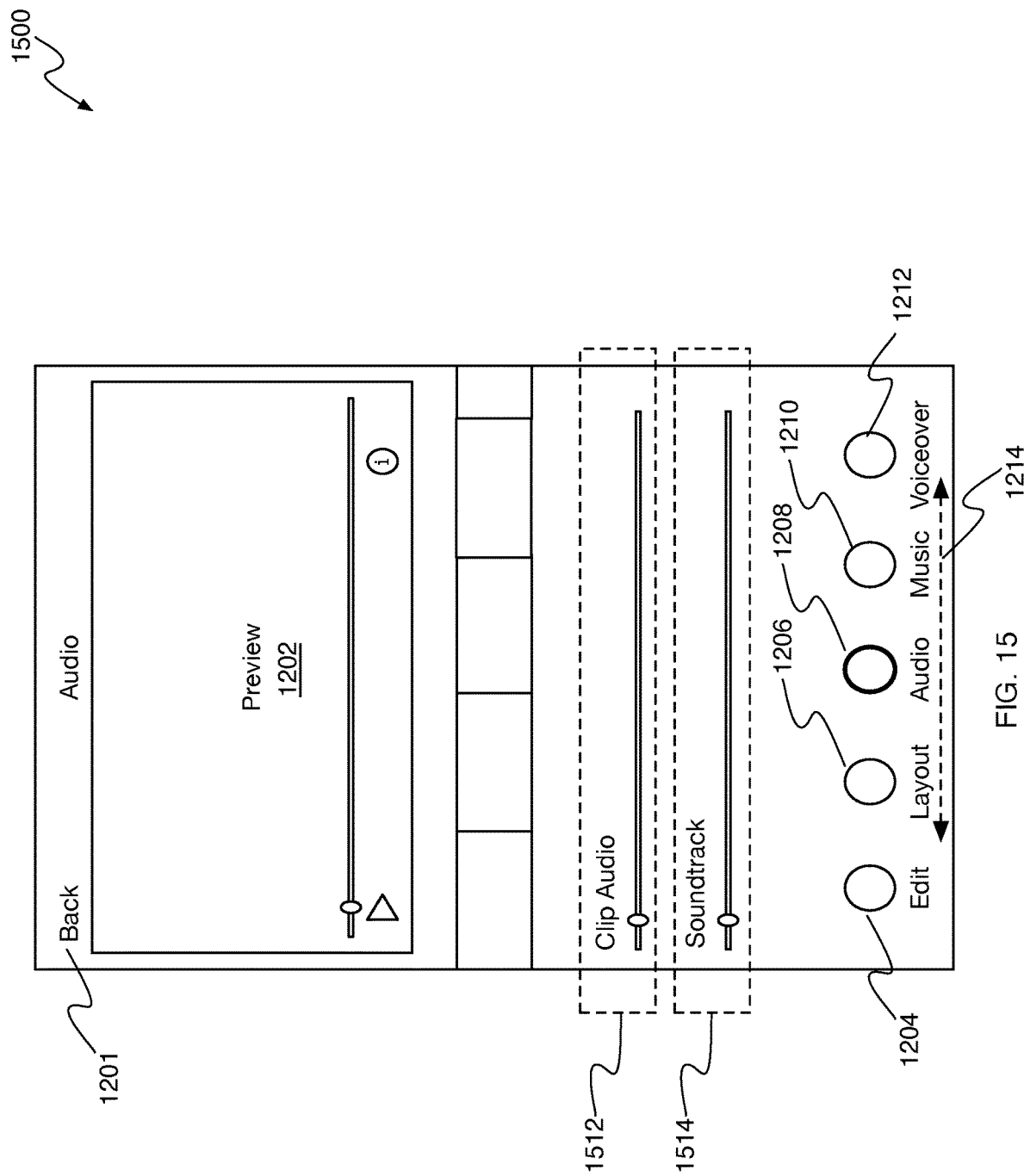
FIG. 15 illustrates an example graphical user interface for adjusting the audio settings for a media item.

FIG. 15 illustrates an example graphical user interface 1500 for adjusting the audio settings for a media item. For example, GUI 1500 can correspond to GUI 1200. Media editing application 104 can present GUI 1500 in response to receiving user input selecting graphical object 1208.

In some implementations, GUI 1500 can present controls 1512 and/or 1514 for adjusting the audio volume levels associated with a selected media item. For example, audio control 1512 can be a slider control that can be manipulated by the user to adjust the audio level of the selected media clip (e.g., voice audio levels, voiceover audio levels, audio captured with the video of the media clip, etc.). Audio control 1514 can be a slider control that can be manipulated by the user to adjust the audio level of the background music track (e.g., soundtrack) selected for the storyboard media project. When media application 104 receives user input adjusting the audio levels for the media item (e.g., media clip) and/or background music, media application 104 can store the user specified sound levels in the storyboard media project data (e.g., in storyboard project data structure 402) so that the sound levels can be applied to the audio output when playing back the selected media clip and/or storyboard project.

In some implementations, GUI 1500 can present graphical object 1210 for editing music tracks associated with the selected media item. For example, in response to receiving user input selecting graphical object 1210, media editing application 104 can present a music track picker graphical user interface (not shown) that allows the user to select one or more music tracks (e.g., from the user's media library) to associate with the selected media item. In response to the user selecting the one or more music tracks, media editing application 104 can store data in the storyboard media project data (e.g., in storyboard project data structure 402) associating the selected music tracks with the selected media item.

Figure 16:
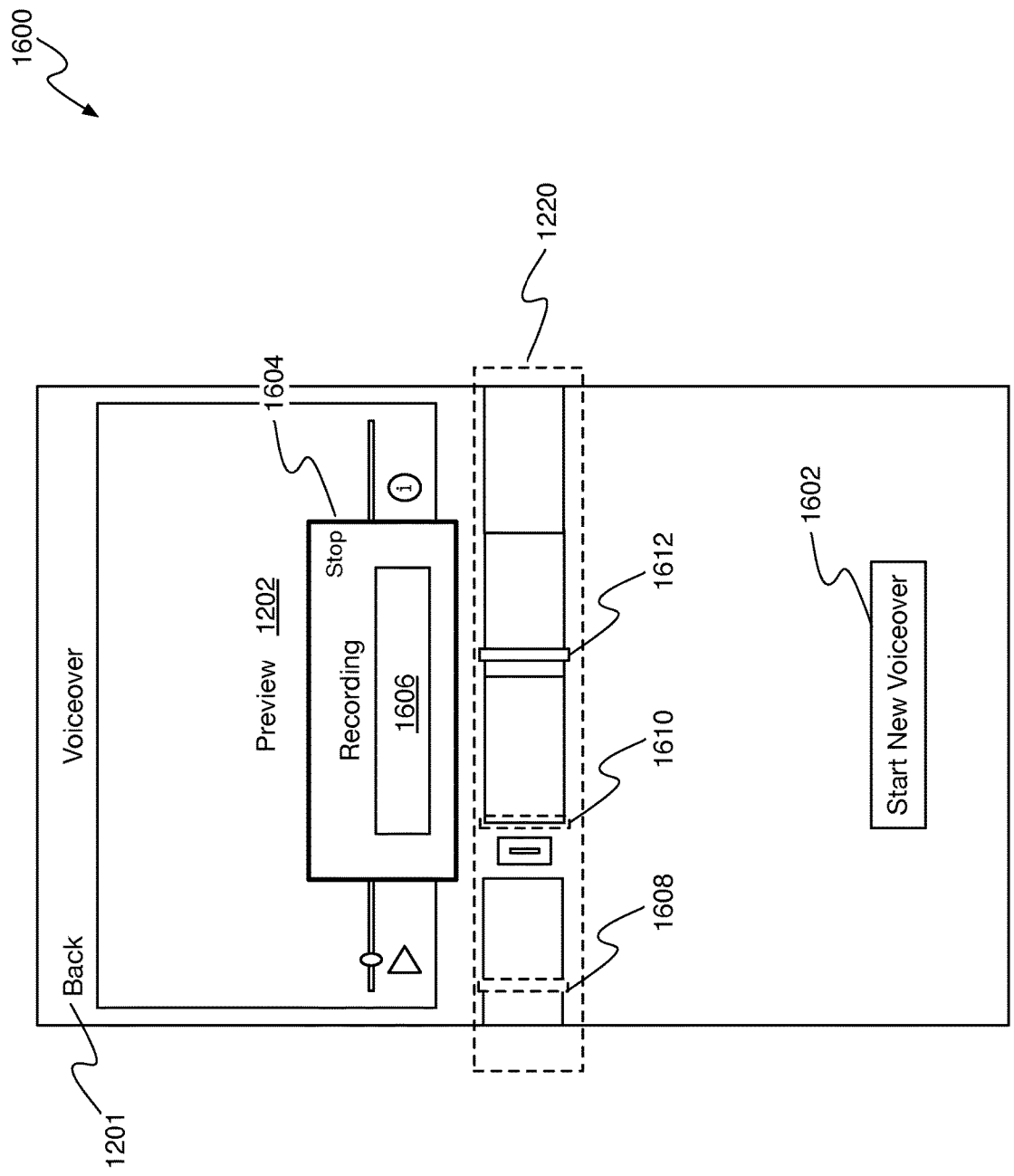
FIG. 16 illustrates an example graphical user interface for capturing a voiceover recording for a selected media item.

FIG. 16 illustrates an example graphical user interface 1600 for capturing a voiceover recording for a selected media item. For example, GUI 1600 can correspond to GUI 1500 described above. Media editing application 104 can present GUI 1600 in response to receiving user input selecting graphical object 1212 representing a voiceover editing option for the selected media item.

In some implementations, GUI 1600 can include graphical object 1602 for initiating a voiceover recording for the selected media item. For example, the user can select a media item, sequence of frames, or a start location (e.g., start location 1610) in a sequence of frames for which a voiceover recording is to be captured. In response to receiving user input selecting graphical object 1602, media editing application 104 can initiate the recording of a voiceover audio track for the selected media item, sequence of frames, or start location.

In some implementations, media editing application 104 can present graphical object 1604 in response to receiving user input to graphical object 1602 initiating the voiceover recording. For example, graphical object 1604 (e.g., a window, overlay, etc.) can present status and/or control features associated with the voiceover recording. Graphical object 1604 can present, for example, an audio level status bar 1606 that indicates the volume, or loudness, of the audio (e.g., ambient sound, voice, etc.) detected by a microphone of user device 102 while capturing the voiceover recording. Graphical object 1604 can include a graphical control selectable by the user to stop the capture of an in-progress voiceover recording.

In some implementations, media editing application 104 can present a countdown timer in response to receiving user input to graphical object 1602 initiating the voiceover recording. For example, the countdown timer can be presented graphically (e.g., by presenting numbers on GUI 1600) and/or verbally (e.g., by presenting speech that audibly counts down) to indicates the amount of time until the capture of the voiceover recording will begin.

In some implementations, the countdown until the beginning of the recording can be represented on media item timeline 1220. For example, in response to receiving user input to graphical object 1602 initiating the voiceover recording, media editing application 104 can present a position indicator (e.g., graphical object, bar, handle, etc.) over the sequence of video frames for which the voiceover is being recorded. When the countdown is initiated, media editing application 104 can initially present the position indicator at location 1608 on the sequence of video frames in timeline 1220. As the countdown progresses, media editing application 104 can move the position indicator forward along the sequence of video frames to location 1610 where the countdown timer reaches zero and the capture of the voiceover recording begins. When media editing application 104 is capturing the voiceover recording, the sound levels associated with the captured audio can be represented in graphical object 1606, as described above. As the position indicator moves from location 1610 to location 1612 on the sequence of video frames, the video frames associated with the captured voice over recording (e.g., the video frames between starting position 1610 and current position 1612) can be highlighted, color coded, or otherwise distinguished, to indicate the frames associated with the voiceover recording captured so far.

In some implementations, media editing application 104 can present the selected media item in preview area 1202 while capturing the voice over recording. For example, in response to receiving user input selecting graphical object 1602 to initiate the voiceover recording, media editing application 104 can present the frames of video of the media item corresponding to the countdown timer and/or the video frames corresponding to the capture of the voiceover recording. Thus, the user can reference the video when providing the audio input for the voiceover recording.

When the user wishes to terminate the capture of the voice over recording, the user can select the graphical control (e.g., a stop button, selectable text, etc.) presented on graphical object 1604 configured for stopping the in-progress recording. For example, in response to receiving user input selecting the stop control, media editing application 104 can stop the capture of the voiceover recording and present GUI 1700 of FIG. 17.

Figure 17:
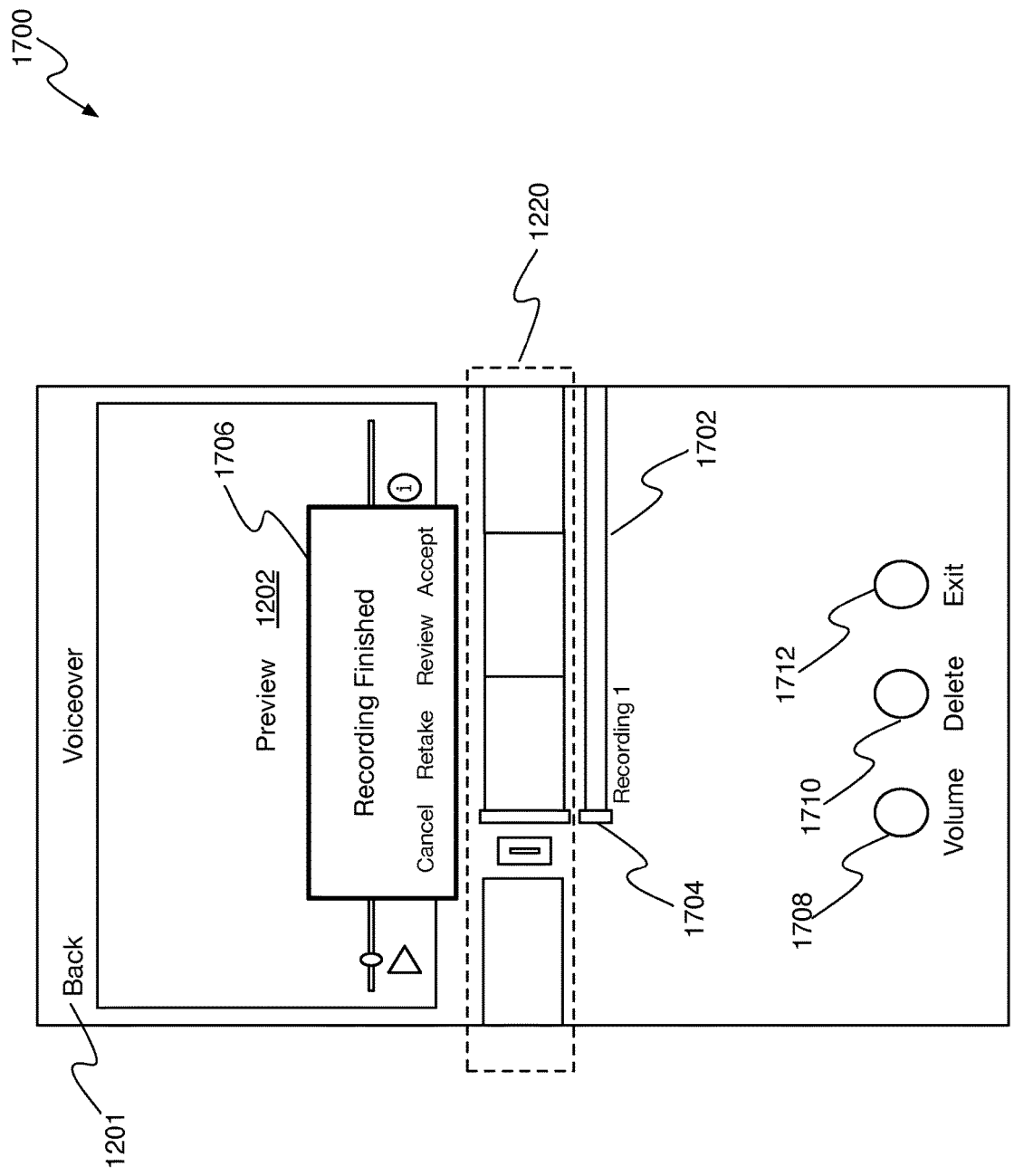
FIG. 17 illustrates an example graphical user interface for editing a captured voiceover recording.

FIG. 17 illustrates an example graphical user interface 1700 for editing a captured voiceover recording. For example, GUI 1700 can correspond to GUI 1600 described above. However, GUI 1700 can present various options for editing, or modifying, the captured voiceover recording.

In some implementations, GUI 1700 can present voiceover recording timeline 1702. For example, voiceover recording timeline 1702 can be presented separately from media item timeline 1220 so that the user can quickly recognize that there is a separate voiceover recording associated with some, or all, of the video frames of the selected media item. Voiceover recording timeline 1702 can be presented such that voiceover timeline 1702 is aligned with the corresponding video frames for which the voiceover was recorded. Voiceover recording timeline 1702 can include graphical object 1704 (e.g., an editing handle) that is manipulable by the user to edit (e.g., trim, cut, etc.) the voiceover recording similar to the sequence of video frames, as described above.

In some implementations, GUI 1700 can include graphical object 1706 that presents selectable options for interacting with the captured voiceover recording. Graphical object 1706 can present an option for canceling the voice over recording. For example, in response to receiving user input selecting the cancel option presented on graphical object 1706, media editing application 104 can discard the captured voiceover recording without saving the voiceover recording to the storyboard media project.

Graphical object 1706 can present an option for retaking the voice over recording. For example, in response to receiving user input selecting the retake option presented on graphical object 1706, media editing application 104 can present GUI 1600 so that the user can capture a new voiceover recording for the selected media item.

Graphical object 1706 can present an option for reviewing the voice over recording. For example, in response to receiving user input selecting the review option presented on graphical object 1706, media editing application 104 can present the captured voiceover recording while also presenting the corresponding video portion of the selected media item in preview area 1202.

Graphical object 1706 can present an option for accepting the voice over recording. For example, in response to receiving user input selecting the accept option presented on graphical object 1706, media editing application 104 can save the captured voice over recording to the storyboard media project in association with the corresponding video frames of the selected media item. Graphical object 1706 can be dismissed (e.g., hidden) in response to receiving user input selecting any of the options presented on graphical object 1706.

In some implementations, GUI 1700 can include graphical object 1708 for adjusting the volume of the captured voiceover recording and/or selected media item. For example, in response to receiving user input selecting graphical object 1708, media editing application 104 can present GUI 1500 so that the user can adjust the audio volume characteristics of the selected media item and/or the captured voiceover recording.

In some implementations, GUI 1700 can include graphical object 1710 for deleting the captured voiceover recording from the selected media item. For example, in response to receiving user input selecting graphical object 1710, media editing application 104 can delete the captured voiceover recording from the storyboard media project.

In some implementations, GUI 1700 can include graphical object 1712 for exiting voiceover GUI 1700. For example, in response to receiving user input selecting graphical object 1712, media editing application 104 can present media item editing GUI 1200 or GUI 1300.

Figure 18:
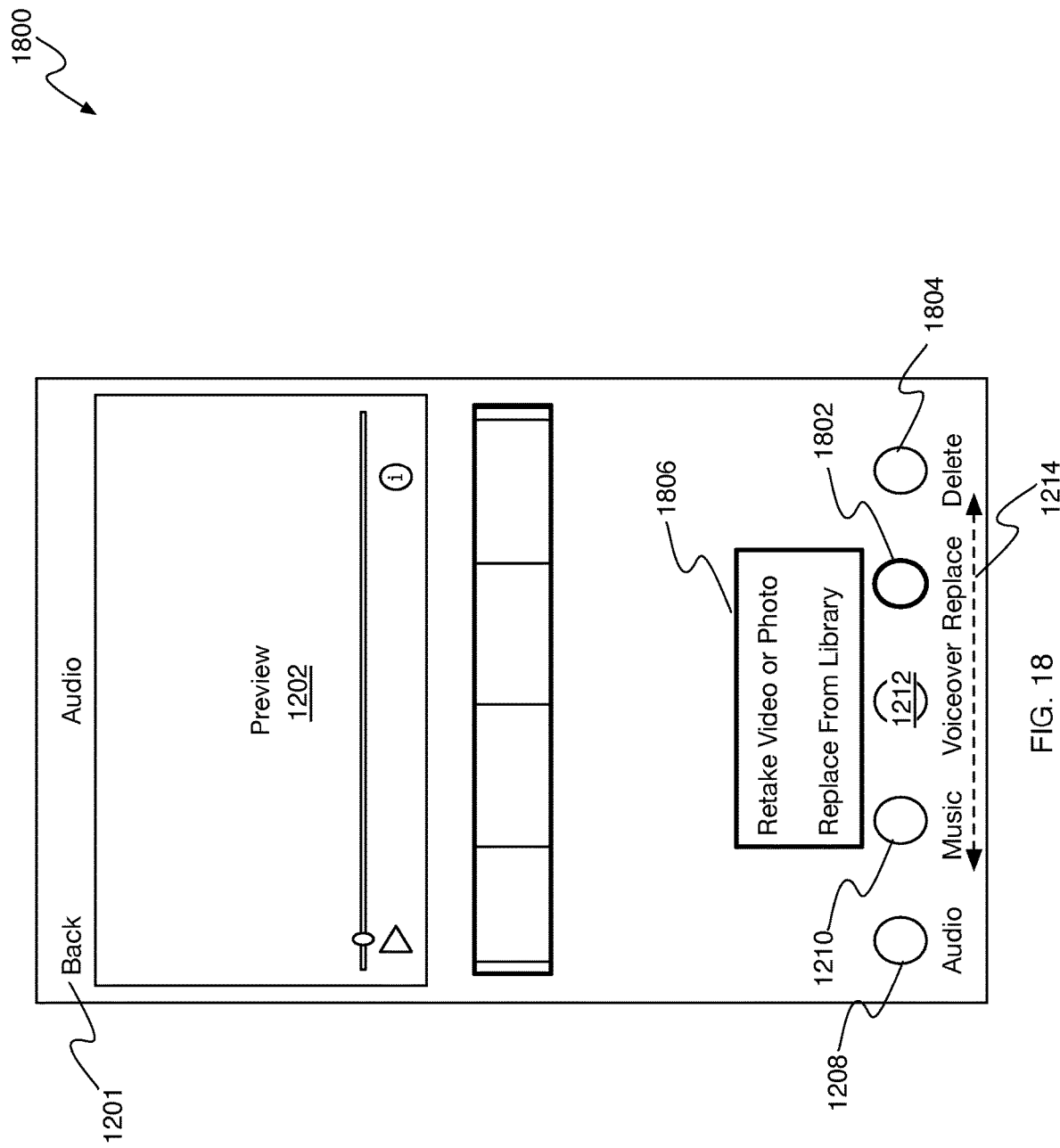
FIG. 18 illustrates an example graphical user interface for replacing a selected media item.

FIG. 18 illustrates an example graphical user interface 1800 for replacing a selected media item. For example, GUI 1800 can correspond to GUI 1200 or GUI 1300 described above. However, with reference to GUI 1800 the user has provided input (e.g., scrolling input, swipe input, etc.) to scroll the editing options presented on GUI 1800 to reveal editing options 1802 and/or 1804 that were previously hidden off screen.

In some implementations, GUI 1800 can include graphical object 1802 for replacing the selected media item. For example, in response to receiving user input selecting graphical object 1802, media editing application 104 can present graphical object 1806 (e.g., a window, overlay, menu, etc.) that presents selectable options for replacing the selected media item. Graphical object 1806 can include, for example, an option to recapture the media item (e.g., video, still image, etc.) using the camera and/or microphone of user device 102. For example, in response to receiving user input selecting the recapture option, media editing application 104 can present a graphical user interface (e.g., a camera GUI not shown) for capturing a video or still image through the camera and/or microphone of user device 102. In response to capturing a new media item (e.g., video, still image, audio recording, etc.), media editing application 104 can replace the selected media item with the newly captured media item.

Graphical object 1806 can include, for example, an option to replace the media item (e.g., video, still image, etc.) with another media item from the user's media library. For example, in response to receiving user input selecting the replace option, media editing application 104 can present a graphical user interface (e.g., a media item picker GUI not shown) for selecting a video or still image from the user's media library. In response to receiving user input selecting a new media item (e.g., video, still image, audio recording, etc.) from the user's media library, media editing application 104 can replace the previously selected media item with the media item newly selected from the user's media library.

In some implementations, GUI 1800 can include graphical object 1804 for deleting the selected media item. For example, in response to receiving user input selecting the graphical object 1804, media editing application 104 can delete the selected media item from the storyboard media project. When media editing application 104 deletes a user selected media item associated with a recommended shot in the selected storyboard template, media editing application 104 can associated the recommended shot with the preconfigured default media item for the recommended shot, as configured in the selected storyboard template.

Figure 19:
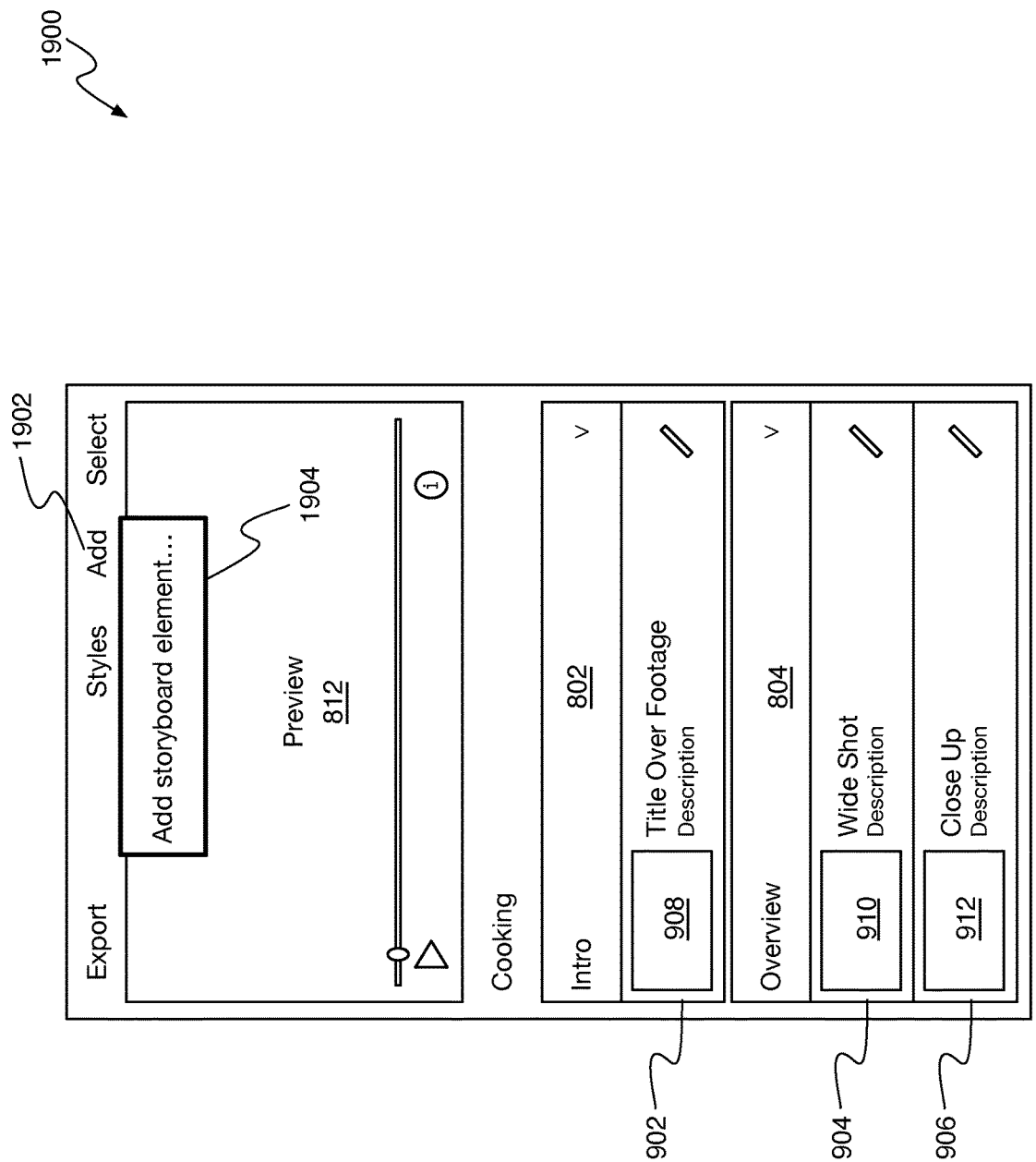
FIG. 19 illustrates an example graphical user interface for adding structural elements to a storyboard template.

FIG. 19 illustrates an example graphical user interface 1900 for adding structural elements to a storyboard template. For example, GUI 1900 can correspond to GUI 800 and/or GUI 900.

In some implementations, GUI 1900 can include a graphical object 1902 for adding a storyboard element to a selected storyboard template. As described above, the user can select a predefined (e.g., preconfigured) storyboard template for creating a storyboard media project. The selected storyboard template can include predefined storyboard elements (e.g., recommended segments, recommended shots, etc.). However, as the user is generating and/or selecting media to fill in the storyboard template to create the storyboard media project, the user may wish to add additional storyboard elements to the storyboard media project.

To add additional storyboard elements to the storyboard media project, the user can select a storyboard template element (e.g., segment, or storyboard shot, etc.), and then select graphical object 1902 to add a storyboard element in sequence before, or after, the selected storyboard template element. For example, if the user selects storyboard segment 804, or selects a shot grouped within segment 804, and adds another storyboard segment, the added storyboard segment may be added to the selected storyboard template either before or after the selected storyboard segment 804. If the user selects storyboard segment 804 and adds a storyboard shot, the added storyboard shot may be added to the selected storyboard segment 804 at the beginning or end of segment 804. If the user selects storyboard shot 910 and adds a storyboard shot, the added storyboard shot may be added either before or after storyboard shot 910 within storyboard segment 804.

In response to receiving user input selecting graphical element 902, media editing application 104 can present graphical object 1904 (e.g., a window, overlay, menu, etc.) that presents a selectable option to add a storyboard element. In response to receiving user input selecting the add option, media editing application can present GUI 2000 of FIG. 20.

Figure 20:
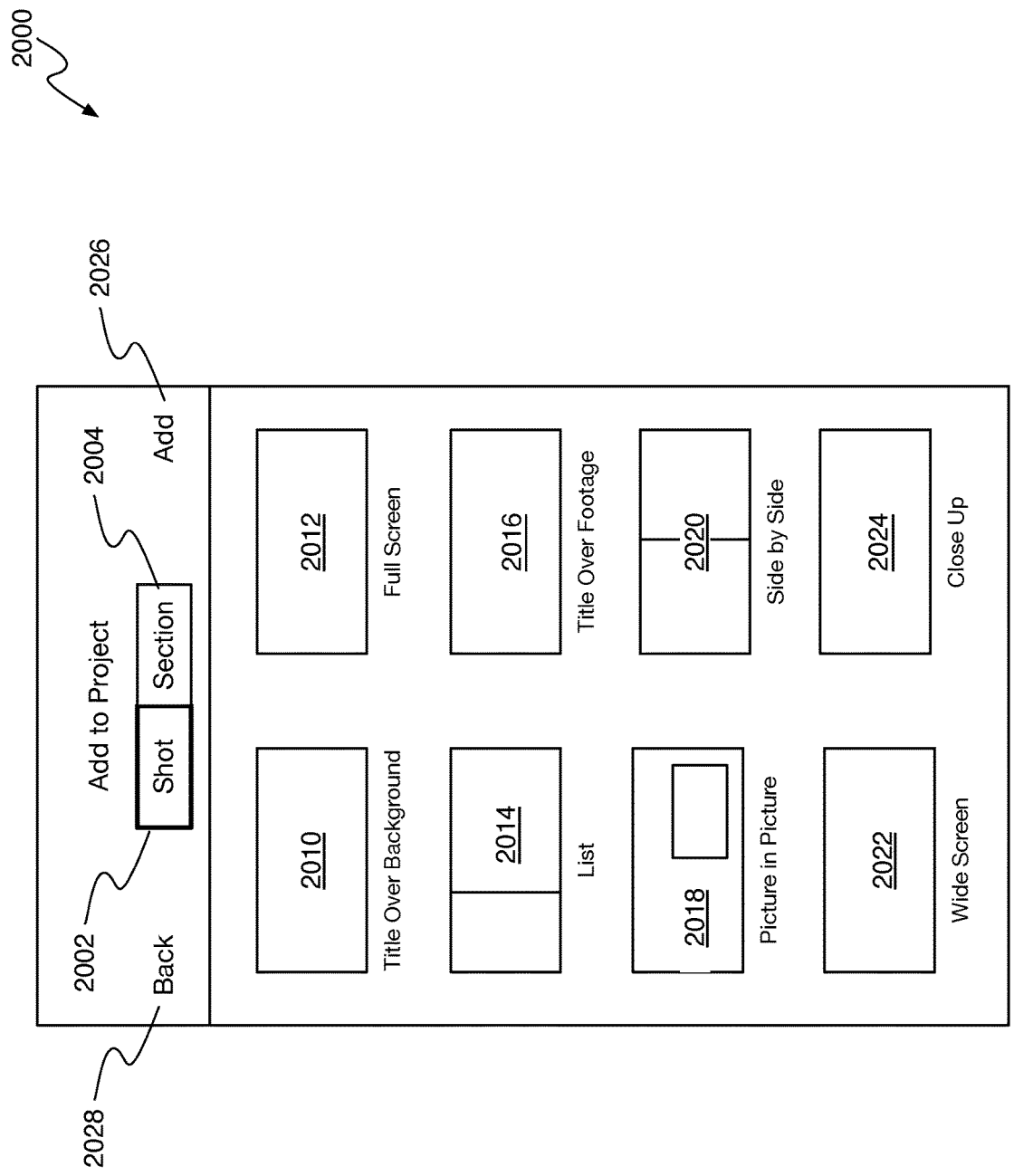
FIG. 20 illustrates an example graphical user interface for adding a shot to a selected storyboard template.

FIG. 20 illustrates an example graphical user interface 2000 for adding a shot to a selected storyboard template. For example, GUI 2000 can be presented by media editing application in response to receiving user input selecting graphical object 1902 and/or graphical object 1904 of GUI 1900.

In some implementations, GUI 2000 can include graphical objects 2002 and/or 2004 for selecting the type of storyboard element to add to the selected storyboard template. For example, in response to receiving user input selecting graphical object 2002, media editing application 104 can present various types of shots (e.g., similar to recommended shots but selected by the user) that the user can select to add to the selected storyboard template. The types of shots presented on GUI 2000 can be limited to the types of shots recommended for the selected storyboard template. The types of shots presented on GUI 2000 can include types of shots recommended for storyboard templates other than the storyboard template selected for the current storyboard media project. The types of shots can include recommended shots and/or various shot formats, as described above. Example shot types include title over background shot 2010, full screen shot 2012, list shot 2014, title over footage shot 2016, picture in picture shot 2018, side by side shot 2020, wide screen shot 2022, close up shot 2024, and/or any other shot or shot format as may be described herein.

In some implementations, the user may select multiple shots to add to a storyboard template. For example, the user may select one or more of the shots 2010-2024 presented on GUI 2000 and then select graphical object 2026 to cause media application 104 to add the selected shots to the storyboard media project, as described above. Media application 104 can exit GUI 2000 and present GUI 1900 in response to receiving user input selecting graphical object 2028.

Figure 21:
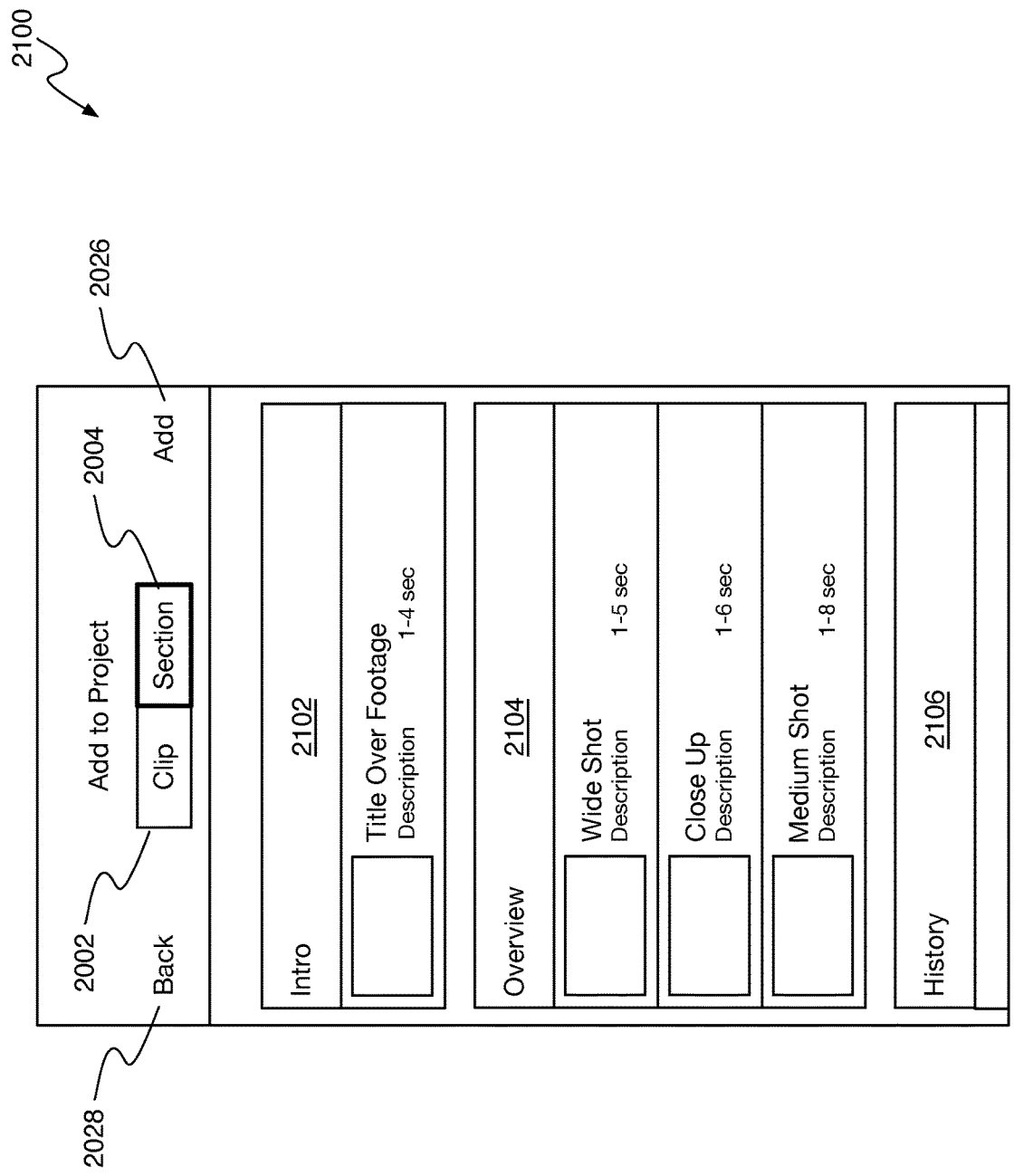
FIG. 21 illustrates an example graphical user interface for adding storyboard template segments to a storyboard media project.

FIG. 21 illustrates an example graphical user interface 2100 for adding storyboard template segments to a storyboard media project. For example, GUI 2100 can correspond to GUI 2000. Media editing application 104 can present GUI 2100 in response to receiving user input selecting graphical element 2004.

In some implementations, GUI 2100 can present various types of storyboard segments for selection by the user. For example, media editing application 104 can present various types of storyboard segments (e.g., similar to recommended storyboard segments but selected by the user) on GUI 2100 that the user can select storyboard segments to add to the selected storyboard template. The types of segments presented on GUI 1900 can be limited to the types of segments recommended for the selected storyboard template. The types of segments presented on GUI 2100 can include types of segments recommended for storyboard templates other than the storyboard template selected for the current storyboard media project. The types of storyboard segments can include any of the storyboard segments described herein, such as introductory segment 2102, overview segment 2104, history segment 2106, or any other type of storyboard segment configured for the storyboard templates accessible to media editing application 104. Thus, the user may combine storyboard segments from different storyboard templates, or duplicate storyboard segments already in the selected storyboard template, to create a custom storyboard template for the user's storyboard media project.

In some implementations, the user may select multiple segments to add to a storyboard template. For example, the user may select one or more of the segments 2102, 2104, 2016, etc., presented on GUI 2100 and then select graphical object 2026 to cause media application 104 to add the selected storyboard segments to the storyboard media project, as described above. Media application 104 can exit GUI 2200 and present GUI 1900 in response to receiving user input selecting graphical object 2028.

Figure 22:
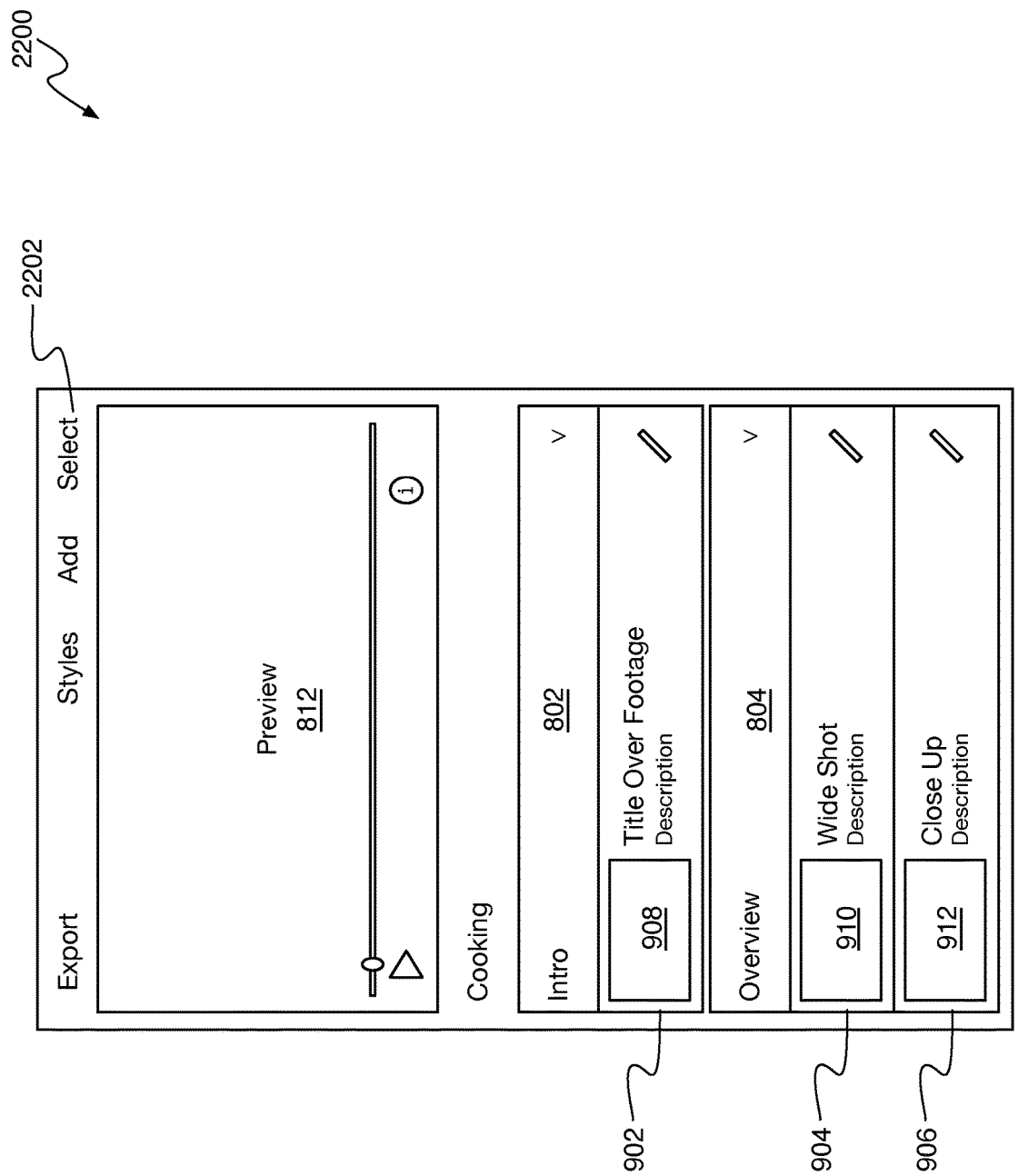
FIG. 22 illustrates an example graphical user interface for invoking a multiple selection mode for storyboard elements.

FIG. 22 illustrates an example graphical user interface 2200 for invoking a multiple selection mode for storyboard elements. For example, GUI 2200 can correspond to GUI 1900 described above. GUI 2200 can present graphical object 2202 for invoking a selection mode for selecting and/or editing one or more storyboard elements. In response to receiving user input selecting graphical object 2202, media editing application 104 can present GUI 2300 of FIG. 23.

Figure 23:
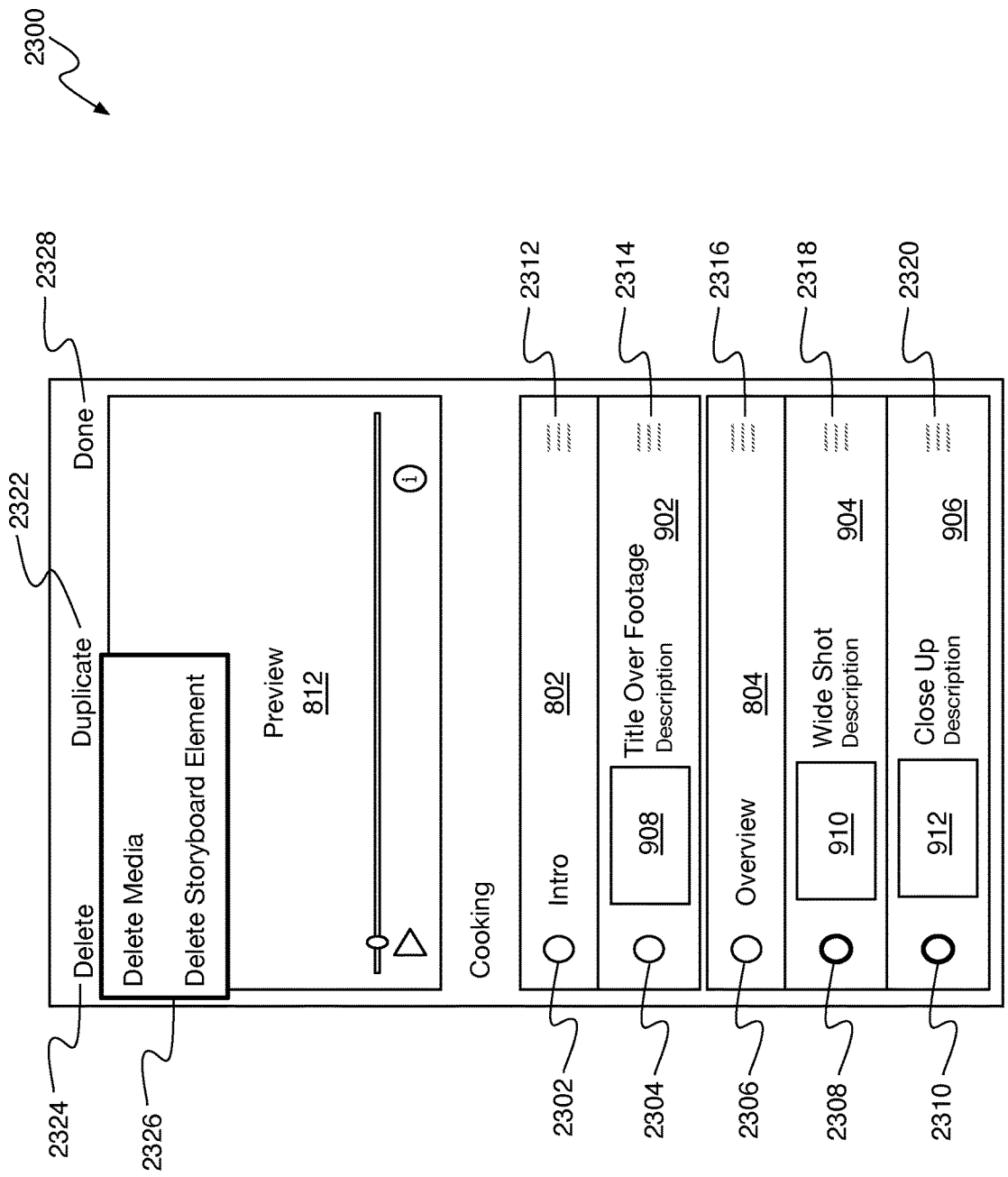
FIG. 23 illustrates an example graphical user interface for performing editing operations with respect to multiple storyboard elements.

FIG. 23 illustrates an example graphical user interface 2300 for performing editing operations with respect to multiple storyboard elements. For example, media editing application 104 can present GUI 2300 in response to receiving user input selecting graphical object 2202 of FIG. 22.

In some implementations, GUI 2300 can include selection indicators 2302-2310 for each storyboard element (e.g., storyboard segment, storyboard shot, etc.) presented on GUI 2300. For example, the information presented in each storyboard element representation can be shifted to provide room to present selection indicators 2302-2310 within the respective storyboard elements. A user may select one or more of selection indicators 2302-2310 to select the corresponding storyboard element. For example, in response to receiving user input selecting selection indictors 2308 and 2310, media editing application 104 can select the corresponding storyboard shots 904 and 906 and change the appearance of selection indictors 2308 and 2310 (e.g., change color, fill with color, highlight, etc.) to indicate that storyboard shots 904 and 906 have been selected.

In some implementations, GUI 2300 can include graphical object 2322 for duplicating selected storyboard elements. For example, when the user has selected one or more storyboard elements (e.g., storyboard segments, storyboard shots, etc.) and then selects graphical object 2322, media editing application 104 can duplicate the selected storyboard elements. When a storyboard segment (e.g., overview segment 804) is duplicated, for example, the storyboard segment and all the shots grouped within the segment may be duplicated within the selected storyboard template. When a storyboard shot (e.g., wide shot 904) is duplicated, for example, the storyboard shot may be duplicated within the corresponding storyboard segment (e.g., storyboard segment 804).

In some implementations, GUI 2300 can include graphical object 2324 for deleting selected storyboard elements and/or corresponding media. For example, when the user has selected one or more storyboard elements (e.g., storyboard segments, storyboard shots, etc.) and then selects graphical object 2324, media editing application 104 can present graphical object 2326 (e.g., a window, overlay, menu, etc.) that includes options for deleting media associated with selected storyboard elements and/or deleting the selected storyboard elements. When media editing application 104 receives user input selecting the delete media option presented by graphical object 2326, media editing application 104 can delete the user selected media items associated with the currently selected storyboard elements. When media editing application 104 receives user input selecting the delete storyboard element option presented by graphical object 2326, media editing application 104 can delete the currently selected storyboard elements (e.g., recommended shots 2308, 2310 and associated media items).

In some implementations, GUI 2300 can present graphical objects 2312-2320 for rearranging storyboard elements associated with the selected storyboard template. For example, graphical objects 2312-2320 can represent handles for respective storyboard template elements. The user can select and drag a handle (e.g., graphical object 2320, graphical object 2312, etc.) to drag the corresponding storyboard template element to a different location, or sequence position, in the selected storyboard template. For example, the user can select and drag graphical object 2312 to correspondingly move storyboard template segment 802, and all of its shots, to a new sequence position (e.g., after overview segment 804) in the storyboard template. Similarly, the user can select and drag graphical object 2318 to correspondingly move storyboard template shot 904 to a new sequence position (e.g., after shot 902 in segment 802) in the storyboard template. When the user is finished editing the storyboard template using the multiple select mode, the user can select graphical object 2328 to return to GUI 900 of FIG. 9, or any other corresponding graphical user interface, as described herein.

Figure 24:
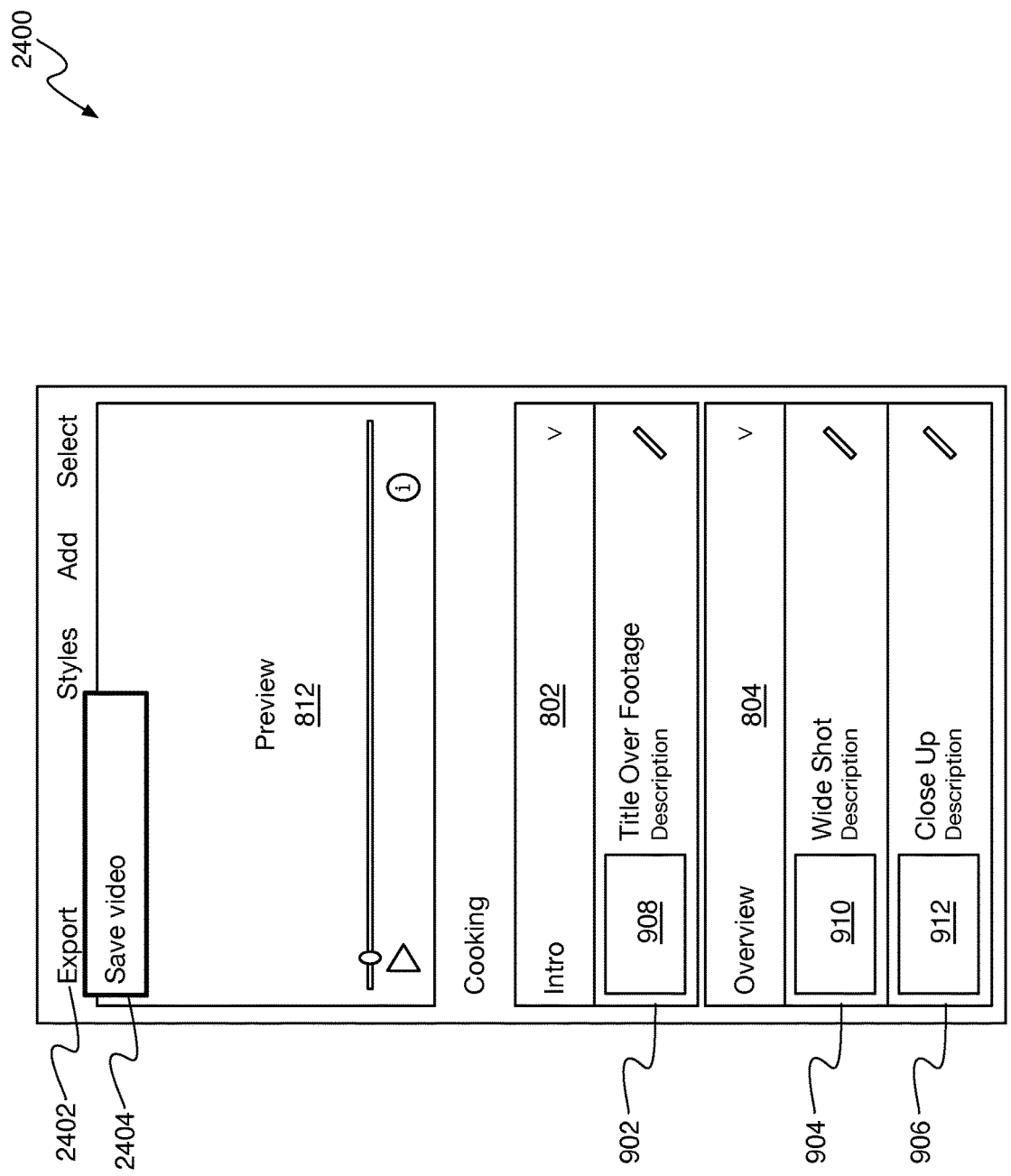
FIG. 24 illustrates an example graphical user interface for exporting a storyboard media project.

FIG. 24 illustrates an example graphical user interface 2400 for exporting a storyboard media project. For example, GUI 2400 can correspond to GUI 900 of FIG. 9 and/or other corresponding graphical user interfaces described herein.

In some implementations, GUI 2400 can include graphical object 2402 for presenting options for exporting a storyboard media project. For example, in response to receiving user input selecting graphical object 2402, media editing application 104 can present graphical object 2404 (e.g., a window, overlay, popup, menu, etc.) that includes selectable options for exporting the storyboard media project presented on GUI 2400. The export options presented by graphical object 2404 can include a "save video" option. For example, in response to receiving user input selecting the "save video" option, media editing application 104 can render, or encode, all of the media items in the storyboard media project, including voiceover recordings, into a single media file, or container, that may be stored on user device 102. When rendering, or encoding, the storyboard media project, media editing application 104 can apply the appropriate style attributes, layouts, and/or other treatments, as described above, so that the rendered media file has the appearance specified by the user for each of the storyboard template elements.

Figure 25:
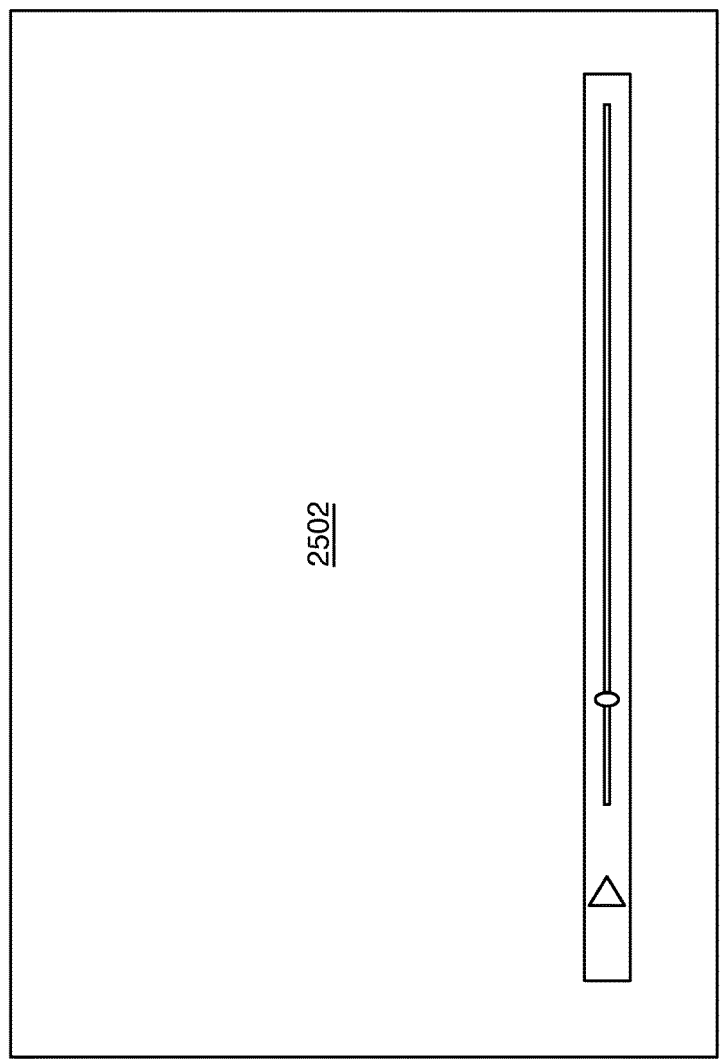
FIG. 25 illustrates an example graphical user interface for presenting an exported storyboard media project.

FIG. 25 illustrates an example graphical user interface 2500 for presenting an exported storyboard media project. For example, after exporting a storyboard media project to a single file or container, media editing application 104 can store the exported storyboard media project to the user's media library. The user can then select the file or container to cause user device 102 to present the file or container (e.g., the audio and/or video encoded in the file or container) in playback area 2502 on a display of user device 102.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 26:
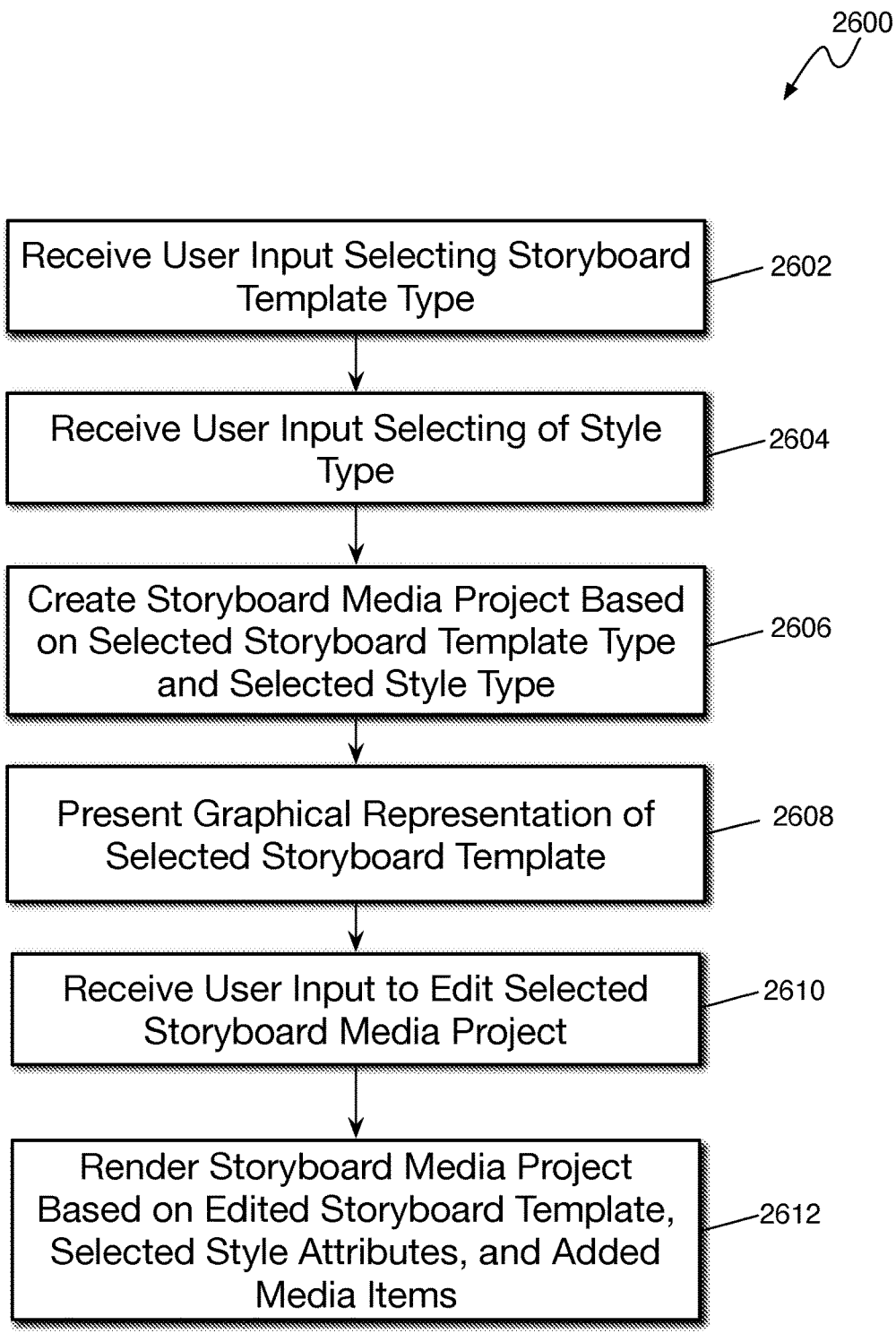
FIG. 26 is flow diagram of an example process for editing media using storyboard templates.

FIG. 26 is flow diagram of an example process 2600 for editing media using storyboard templates. For example, media editing application 104 running on user device 102 can guide the user of user device 102 through the creation of a media project using storyboard templates that provide recommended media segments and recommended shots so that even a novice user can create a high quality, well-structured media project.

At step 2602, user device 102 can receive user input selecting a storyboard template type. For example, after receiving user input indicating that the user would like to create a new storyboard media project, media application 104 can present representations of a variety of storyboard templates for guiding the user through the creation of different categories, types, or topics of media content. The user may select one of the presented storyboard templates according to the type or topic of content the user wishes to create, as described with reference to FIG. 5 and FIG. 6.

At step 2604, user device 102 can receive user input selecting a style type template. For example, media application 104 can present representations of a variety of style type templates. The user can select one of the style type templates, and edit the style template if desired, to specify the style attributes that should be applied to the storyboard media project, as described with reference to FIG. 7.

At step 2606, user device 102 can create the storyboard media project based on the selected storyboard template and the selected style template. For example, media editing application 104 can receive user input indicating that media editing application 104 should create a new storyboard media project based on the selected storyboard template and the selected style template, as described with reference to FIG. 7. In response to receiving the user input, media editing application 104 can create the new storyboard media project based on the selected storyboard template and the selected style template.

At step 2608, user device 102 can present a graphical representation of the selected storyboard template. For example, media editing application 104 can present graphical representations of the structural elements (e.g., segments, shots, etc.) of the storyboard template selected for the storyboard media project, as described with reference to FIG. 8, FIG. 9, and other figures described above. The graphical representation of the selected storyboard template can, the structure that it suggests, and the suggested shots for each segment, and the sequence of segments and shots that the storyboard template suggests can efficiently guide the user through the media creation process so that the resulting media product is of sufficiently high quality and satisfactory to the user.

At step 2610, user device 102 can receive user input to edit the selected storyboard template. For example, media editing application 104 can receive user input to edit various aspects of the storyboard media project, the storyboard template, selected media items, and/or selected style elements, as described with reference to FIG. 10 through FIG. 23 above.

At step 2612, user device 102 can render the storyboard media project based on the selected storyboard template, the selected style type, user selected media items, and any user edits. For example, media editing application 104 can render (e.g., export, encode, etc.) the storyboard media project to a single media file (e.g., video file), or single media container (e.g., mp4 container, movie container, etc.), such that the resulting media file, or container, includes an aggregate of the user selected media items, presented in the shot sequence defined by the selected storyboard template, having an appearance defined by the selected style type, and including any modifications or edits made by the user to the selected templates and/or media items, as described above with reference to FIG. 24.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to create a storyboard media project. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to present media items that are relevant to the storyboard media project. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, when creating or configuring a storyboard media project or obtaining the various templates used to create a storyboard media project from network sources or services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, media items and/or template data can be delivered or recommended based on non-personal information data or a bare minimum amount of personal information, such as the content being requested by the device associated with a user, other non-personal information available to the server device, or publicly available information.

Example System Architecture

Figure 27:
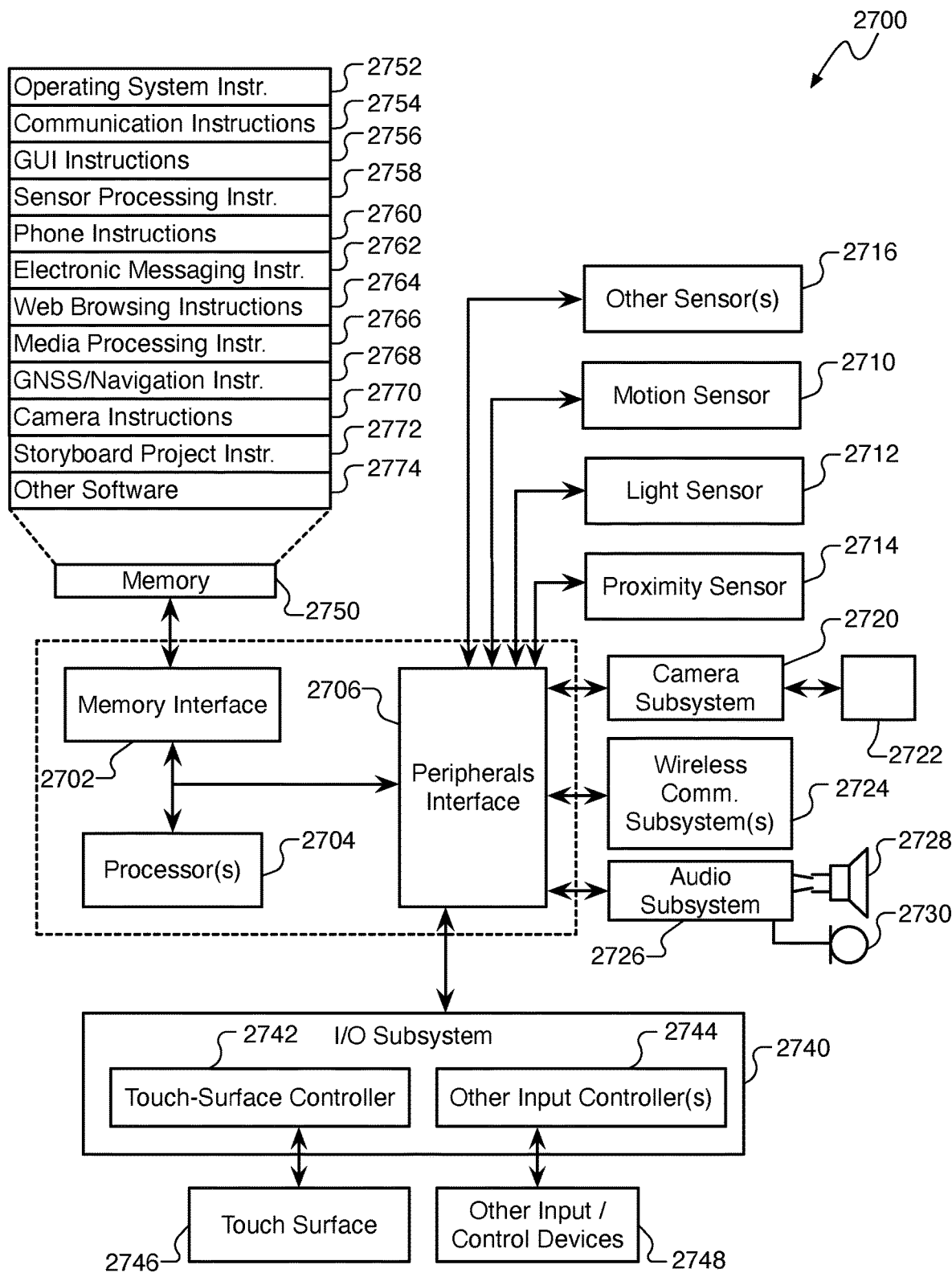
FIG. 27 is a block diagram of an example computing device that can implement the features and processes of FIGS. 1-26.

FIG. 27 is a block diagram of an example computing device 2700 that can implement the features and processes of FIGS. 1-26. The computing device 2700 can include a memory interface 2702, one or more data processors, image processors and/or central processing units 2704, and a peripherals interface 2706. The memory interface 2702, the one or more processors 2704 and/or the peripherals interface 2706 can be separate components or can be integrated in one or more integrated circuits. The various components in the computing device 2700 can be coupled by one or more communication buses or signal lines.

Sensors, devices, and subsystems can be coupled to the peripherals interface 2706 to facilitate multiple functionalities. For example, a motion sensor 2710, a light sensor 2712, and a proximity sensor 2714 can be coupled to the peripherals interface 2706 to facilitate orientation, lighting, and proximity functions. Other sensors 2716 can also be connected to the peripherals interface 2706, such as a global navigation satellite system (GNSS) (e.g., GPS receiver), a temperature sensor, a biometric sensor, magnetometer or other sensing device, to facilitate related functionalities.

A camera subsystem 2720 and an optical sensor 2722, e.g., a charged coupled device (CCD) or a complementary metal-oxide semiconductor (CMOS) optical sensor, can be utilized to facilitate camera functions, such as recording photographs and video clips. The camera subsystem 2720 and the optical sensor 2722 can be used to collect images of a user to be used during authentication of a user, e.g., by performing facial recognition analysis.

Communication functions can be facilitated through one or more wireless communication subsystems 2724, which can include radio frequency receivers and transmitters and/or optical (e.g., infrared) receivers and transmitters. The specific design and implementation of the communication subsystem 2724 can depend on the communication network(s) over which the computing device 2700 is intended to operate. For example, the computing device 2700 can include communication subsystems 2724 designed to operate over a GSM network, a GPRS network, an EDGE network, a Wi-Fi or WiMax network, and a Bluetooth™ network. In particular, the wireless communication subsystems 2724 can include hosting protocols such that the device 100 can be configured as a base station for other wireless devices.

An audio subsystem 2726 can be coupled to a speaker 2728 and a microphone 2730 to facilitate voice-enabled functions, such as speaker recognition, voice replication, digital recording, and telephony functions. The audio subsystem 2726 can be configured to facilitate processing voice commands, voiceprinting and voice authentication, for example.

The I/O subsystem 2740 can include a touch-surface controller 2742 and/or other input controller(s) 2744. The touch-surface controller 2742 can be coupled to a touch surface 2746. The touch surface 2746 and touch-surface controller 2742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 2746.

The other input controller(s) 2744 can be coupled to other input/control devices 2748, such as one or more buttons, rocker switches, thumb-wheel, infrared port, USB port, and/or a pointer device such as a stylus. The one or more buttons (not shown) can include an up/down button for volume control of the speaker 2728 and/or the microphone 2730.

In one implementation, a pressing of the button for a first duration can disengage a lock of the touch surface 2746; and a pressing of the button for a second duration that is longer than the first duration can turn power to the computing device 2700 on or off. Pressing the button for a third duration can activate a voice control, or voice command, module that enables the user to speak commands into the microphone 2730 to cause the device to execute the spoken command. The user can customize a functionality of one or more of the buttons. The touch surface 2746 can, for example, also be used to implement virtual or soft buttons and/or a keyboard.

In some implementations, the computing device 2700 can present recorded audio and/or video files, such as MP3, AAC, and MPEG files. In some implementations, the computing device 2700 can include the functionality of an MP3 player, such as an iPod™.

The memory interface 2702 can be coupled to memory 2750. The memory 2750 can include high-speed random-access memory and/or non-volatile memory, such as one or more magnetic disk storage devices, one or more optical storage devices, and/or flash memory (e.g., NAND, NOR). The memory 2750 can store an operating system 2752, such as Darwin, RTXC, LINUX, UNIX, OS X, WINDOWS, or an embedded operating system such as VxWorks.

The operating system 2752 can include instructions for handling basic system services and for performing hardware dependent tasks. In some implementations, the operating system 2752 can be a kernel (e.g., UNIX kernel). In some implementations, the operating system 2752 can include instructions for editing storyboard media projects. For example, operating system 2752 can implement the storyboard media project editing features as described with reference to FIGS. 1-26.

The memory 2750 can also store communication instructions 2754 to facilitate communicating with one or more additional devices, one or more computers and/or one or more servers. The memory 2750 can include graphical user interface instructions 2756 to facilitate graphic user interface processing; sensor processing instructions 2758 to facilitate sensor-related processing and functions; phone instructions 2760 to facilitate phone-related processes and functions; electronic messaging instructions 2762 to facilitate electronic-messaging related processes and functions; web browsing instructions 2764 to facilitate web browsing-related processes and functions; media processing instructions 2766 to facilitate media processing-related processes and functions; GNSS/Navigation instructions 2768 to facilitate GNSS and navigation-related processes and instructions; and/or camera instructions 2770 to facilitate camera-related processes and functions.

The memory 2750 can store software instructions 2772 to facilitate other processes and functions, such as the storyboard media project editing processes and functions as described with reference to FIGS. 1-26.

The memory 2750 can also store other software instructions 2774, such as web video instructions to facilitate web video-related processes and functions; and/or web shopping instructions to facilitate web shopping-related processes and functions. In some implementations, the media processing instructions 2766 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 2750 can include additional instructions or fewer instructions. Furthermore, various functions of the computing device 2700 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

The invention claimed is:

1. A method comprising:
presenting, by a computing device, a plurality of storyboard templates on a display of the computing device;
receiving, by the computing device, a first user input selecting a particular one of the storyboard templates, wherein the particular storyboard template includes recommended segment types;
presenting, by the computing device, a plurality of style templates on the display of the computing device, where each style template includes style attributes that define how media items of the storyboard media project will appear when presented on the display;
receiving, by the computing device, a second user input selecting a particular one of the style templates,
creating, by the computing device, a storyboard media project based on the particular storyboard template selected by the user and the particular style template selected by the user;
displaying, by the computing device, one or more representations of the recommended segment types based on the particular storyboard template selected by the user;
subsequent to displaying the one or more representations of the recommended segment types:
receiving, by the computing device, content corresponding to at least one of the recommended segment types;
wherein the storyboard media project is created or updated based on the content received by the computing device; and
presenting, by the computing device, a graphical representation of the storyboard media project.

2. The method of claim 1, further comprising: presenting, by the computing device, a graphical representation of the particular storyboard template on the display of the computing device, the graphical representation including at least one of the recommended segment types and a recommended shot associated with the at least one recommended segment.

3. The method of claim 2, further comprising:
receiving, by the computing device, a third user input selecting a media item for the recommended shot;
associating, by the computing device, the media item with the recommended shot; and
presenting, by the computing device, a graphical representation of the media item associated with the recommended shot on the graphical representation of the storyboard template.

4. The method of claim 3, further comprising:
receiving, by the computing device, a fourth user input initiating playback of the media item associated with the recommended shot; and
presenting, by the computing device, the media item on the display of the computing device according to the particular style template selected by the user.

5. The method of claim 4, further comprising:
receiving, by the computing device, a fifth user input selecting a layout for presenting the media item; and
presenting, by the computing device, the media item on the display of the computing device according to the particular style template and the layout selected by the user, where an appearance of graphical elements of the layout is determined based on the style attributes of the particular style template.

6. The method of claim 1, further comprising:
receiving, by the computing device, a sixth user input to selecting a storyboard element to add to the particular storyboard template, where the storyboard element is selected from a group of elements that includes a storyboard segment and a storyboard shot;
in response to the sixth input, adding the storyboard element to the particular storyboard template; and
presenting, by the computing device, a graphical representation of the particular storyboard template on the display of the computing device, the graphical representation including the added storyboard element.

7. A computing device comprising:
a one or more processors; and
a non-transitory computer readable medium including one or more sequences of instructions that, when executed by the one or more processors, cause the processors to perform operations comprising:
presenting, by the computing device, a plurality of storyboard templates on a display of the computing device;
receiving, by the computing device, a first user input selecting a particular one of the storyboard templates, wherein the particular storyboard template includes recommended segment types;
presenting, by the computing device, a plurality of style templates on the display of the computing device, where each style template includes style attributes that define how media items of the storyboard media project will appear when presented on the display;
receiving, by the computing device, a second user input selecting a particular one of the style templates,
creating, by the computing device, a storyboard media project based on the particular storyboard template selected by the user and the particular style template selected by the user;
displaying, by the computing device, one or more representations of the recommended segment types based on the particular storyboard template selected by the user;
subsequent to displaying the one or more representations of the recommended segment types: receiving, by the computing device, content corresponding to at least one of the recommended segment types;
wherein the storyboard media project is created or updated based on the content received by the computing device; and
presenting, by the computing device, a graphical representation of the storyboard media project.

8. The computing device of claim 7, wherein the instructions cause the processors to perform operations comprising:
presenting, by the computing device, a graphical representation of the particular storyboard template on the display of the computing device, the graphical representation including at least one of the recommended segments and a recommended shot associated with the at least one recommended segment.

9. The computing device of claim 8, wherein the instructions cause the processors to perform operations comprising:
receiving, by the computing device, a third user input selecting a media item for the recommended shot;
associating, by the computing device, the media item with the recommended shot; and presenting, by the computing device, a graphical representation of the media item associated with the recommended shot on the graphical representation of the storyboard template.

10. The computing device of claim 9, wherein the instructions cause the processors to perform operations comprising:
receiving, by the computing device, a fourth user input initiating playback of the media item associated with the recommended shot; and
presenting, by the computing device, the media item on the display of the computing device according to the particular style template selected by the user.

11. The computing device of claim 10, wherein the instructions cause the processors to perform operations comprising:
receiving, by the computing device, a fifth user input selecting a layout for presenting the media item; and
presenting, by the computing device, the media item on the display of the computing device according to the particular style template and the layout selected by the user, where an appearance of graphical elements of the layout is determined based on the style attributes of the particular style template.

12. The computing device of claim 7, wherein the instructions cause the processors to perform operations comprising:
receiving, by the computing device, a sixth user input to selecting a storyboard element to add to the particular storyboard template, where the storyboard element is selected from a group of elements that includes a storyboard segment and a storyboard shot;
in response to the sixth input, adding the storyboard element to the particular storyboard template; and
presenting, by the computing device, a graphical representation of the particular storyboard template on the display of the computing device, the graphical representation including the added storyboard element.

13. A non-transitory computer readable medium including one or more sequences of instructions that, when executed by one or more processors, cause the processors to perform operations comprising:
presenting, by the computing device, a plurality of storyboard templates on a display of the computing device;
receiving, by the computing device, a first user input selecting a particular one of the storyboard templates, wherein the particular storyboard template includes recommended segment types;
presenting, by the computing device, a plurality of style templates on the display of the computing device, where each style template includes style attributes that define how media items of the storyboard media project will appear when presented on the display;
receiving, by the computing device, a second user input selecting a particular one of the style templates,
creating, by the computing device, a storyboard media project based on the particular storyboard template selected by the user and the particular style template selected by the user;
displaying, by the computing device, one or more representations of the recommended segment types based on the particular storyboard template selected by the user;
subsequent to displaying the one or more representations of the recommended segment types: receiving, by the computing device, content corresponding to at least one of the recommended segment types;
wherein the storyboard media project is created or updated based on the content received by the computing device; and
presenting, by the computing device, a graphical representation of the storyboard media project.

14. The non-transitory computer readable medium of claim 13, wherein the instructions cause the processors to perform operations comprising:
presenting, by the computing device, a graphical representation of the particular storyboard template on the display of the computing device, the graphical representation including at least one of the recommended segments and a recommended shot associated with the at least one recommended segment.

15. The non-transitory computer readable medium of claim 14, wherein the instructions cause the processors to perform operations comprising:
receiving, by the computing device, a third user input selecting a media item for the recommended shot;
associating, by the computing device, the media item with the recommended shot; and
presenting, by the computing device, a graphical representation of the media item associated with the recommended shot on the graphical representation of the storyboard template.

16. The non-transitory computer readable medium of claim 15, wherein the instructions cause the processors to perform operations comprising:
receiving, by the computing device, a fourth user input initiating playback of the media item associated with the recommended shot;
presenting, by the computing device, the media item on the display of the computing device according to the particular style template selected by the user;
receiving, by the computing device, a fifth user input selecting a layout for presenting the media item; and
presenting, by the computing device, the media item on the display of the computing device according to the particular style template and the layout selected by the user, where an appearance of graphical elements of the layout is determined based on the style attributes of the particular style template.

17. The non-transitory computer readable medium of claim 13, wherein the instructions cause the processors to perform operations comprising:
receiving, by the computing device, a sixth user input to selecting a storyboard element to add to the particular storyboard template, where the storyboard element is selected from a group of elements that includes a storyboard segment and a storyboard shot;
in response to the sixth input, adding the storyboard element to the particular storyboard template; and
presenting, by the computing device, a graphical representation of the particular storyboard template on the display of the computing device, the graphical representation including the added storyboard element.

* * * * *